(12) United States Patent
Asai et al.

(10) Patent No.: US 12,492,327 B2
(45) Date of Patent: Dec. 9, 2025

(54) PHOTO-CROSSLINKABLE PRESSURE-SENSITIVE ADHESIVE AND USE THEREOF

(71) Applicant: NITTO DENKO CORPORATION, Ibaraki (JP)

(72) Inventors: Ryoko Asai, Ibaraki (JP); Naofumi Kosaka, Ibaraki (JP); Yosuke Shimizu, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 598 days.

(21) Appl. No.: 17/632,261

(22) PCT Filed: Jul. 28, 2020

(86) PCT No.: PCT/JP2020/028917
§ 371 (c)(1),
(2) Date: Feb. 2, 2022

(87) PCT Pub. No.: WO2021/024862
PCT Pub. Date: Feb. 11, 2021

(65) Prior Publication Data
US 2022/0275250 A1    Sep. 1, 2022

(30) Foreign Application Priority Data
Aug. 2, 2019   (JP) ................................. 2019-143392

(51) Int. Cl.
*C09J 7/38*      (2018.01)
*C09J 11/06*     (2006.01)
*C09J 201/06*    (2006.01)

(52) U.S. Cl.
CPC ................. *C09J 7/38* (2018.01); *C09J 11/06* (2013.01); *C09J 201/06* (2013.01);
(Continued)

(58) Field of Classification Search
USPC ........................................................ 156/326
See application file for complete search history.

(56) References Cited

U.S. PATENT DOCUMENTS

| 4,737,559 A | 4/1988 | Kellen et al. |
| 4,847,137 A | 7/1989 | Kellen et al. |

(Continued)

FOREIGN PATENT DOCUMENTS

| CN | 101595191 A | 12/2009 |
| JP | S62-284651 A | 12/1987 |

(Continued)

OTHER PUBLICATIONS

Chinese First Office Action dated Mar. 1, 2024 for corresponding Chinese Patent Application No. 202080052401.5, with English machine translation (12 pages).

(Continued)

*Primary Examiner* — S. Behrooz Ghorishi
*Assistant Examiner* — Gregory C. Grosso
(74) *Attorney, Agent, or Firm* — Hauptman Ham, LLP

(57) ABSTRACT

Provided is a photo-crosslinkable PSA comprising a polymer having side-chain benzophenone structures. The photo-crosslinkable PSA is a cured product of a PSA composition comprising an ethylenically unsaturated compound and a benzophenone structure-containing component. The photo-crosslinkable PSA has VOC emissions of 500 µg/g or less. Also provided is a PSA sheet having a PSA layer formed from the photo-crosslinkable PSA.

10 Claims, 1 Drawing Sheet

(52) U.S. Cl.
CPC .... *C09J 2301/302* (2020.08); *C09J 2301/416* (2020.08); *C09J 2400/143* (2013.01)

(56) References Cited

U.S. PATENT DOCUMENTS

| | | | | |
|---|---|---|---|---|
| 6,015,871 | A * | 1/2000 | Jamasbi | C08G 18/4063 |
| | | | | 526/89 |
| 11,680,139 | B2 * | 6/2023 | Kumazawa | H05K 1/0353 |
| | | | | 528/310 |
| 2009/0272950 | A1 * | 11/2009 | Lu | C09J 4/06 |
| | | | | 252/585 |
| 2010/0255241 | A1 | 10/2010 | Wada et al. | |
| 2014/0302313 | A1 * | 10/2014 | Suwa | C09J 133/14 |
| | | | | 525/289 |
| 2018/0208583 | A1 * | 7/2018 | Kunimoto | G03F 7/0388 |
| 2020/0216724 | A1 | 7/2020 | Lee et al. | |
| 2020/0231846 | A1 | 7/2020 | Nakano et al. | |

FOREIGN PATENT DOCUMENTS

| | | | |
|---|---|---|---|
| JP | 2009-51915 A | 3/2009 | |
| JP | 2010-509439 A | 3/2010 | |
| JP | 2010-241921 A | 10/2010 | |
| JP | 2012-140497 A | 7/2012 | |
| JP | 2013-40256 A | 2/2013 | |
| JP | 2015-214601 A | 12/2015 | |
| KR | 10-2014-0051398 A | 4/2014 | |
| KR | 10-2019-0037936 A | 4/2019 | |
| WO | 2008/057488 A2 | 5/2008 | |
| WO | WO-2013025443 A2 * | 2/2013 | ............. B32B 7/12 |
| WO | 2019/065375 A1 | 4/2019 | |
| WO | 2019/066528 A1 | 4/2019 | |

OTHER PUBLICATIONS

International Search Report issued on Oct. 13, 2020, for corresponding International Patent Application No. PCT/JP2020/028917, along with an English translation.
Written Opinion issued on Oct. 13, 2020, for corresponding International Patent Application No. PCT/JP2020/028917.
Office Action issued on Apr. 3, 2024 for corresponding Taiwanese Patent Application No. 109125996, along with an English machine translation (11 pages).
English translation of International Preliminary Report on Patentability issued on Feb. 8, 2022 for corresponding International Patent Application No. PCT/JP2020/028917.
Office Action issued on Jul. 25, 2024 for corresponding Japanese Patent Application No. 2020-127561, along with an English machine translation (10 pages).
Office Action issued on Sep. 24, 2024, for corresponding Korean Patent Application No. 10-2022-7006412, along with an English machine translation (11 pages).
Chinese Office Action issued on Dec. 7, 2024, in connection with the Chinese Patent Application No. 202080052401.5, with its English translation, 8 pages.
Japanese Office Action issued on Jan. 9, 2025, in connection with the Japanese Patent Application No. 2020-127561, with its English translation, 11 page.
Office Action issued on Mar. 6, 2025 for corresponding Korean Patent Application No. 10-2022-7006412, along with an English machine translation (10 pages).
Office Action issued on Mar. 18, 2025 for corresponding Taiwanese Patent Application No. 109125996, along with an English translation (8 pages).

* cited by examiner

PHOTO-CROSSLINKABLE PRESSURE-SENSITIVE ADHESIVE AND USE THEREOF

CROSS REFERENCE TO RELATED APPLICATIONS

This application is a National Stage of International Application No. PCT/JP2020/028917, filed on Jul. 28, 2020, which designates the United States and was published in Japan, and which claims priority to Japanese Patent Application No. 2019-143392, filed on Aug. 2, 2019 in the Japan Patent Office. All of the aforementioned applications are hereby incorporated by reference in their entireties.

TECHNICAL FIELD

The present invention relates to a photo-crosslinkable pressure-sensitive adhesive, a pressure-sensitive adhesive sheet having a pressure-sensitive adhesive layer comprising a photo-crosslinkable pressure-sensitive adhesive, a method for producing a laminate using a photo-crosslinkable pressure-sensitive adhesive, a method for producing a photo-crosslinkable pressure-sensitive adhesive, and a pressure-sensitive adhesive composition used for producing a photo-crosslinkable pressure-sensitive adhesive.

BACKGROUND ART

In general, pressure-sensitive adhesive (PSA) exists as a soft solid (a viscoelastic material) in a room temperature range and has a property to adhere easily to an adherend with some pressure applied. For such a property, PSA has been widely used in various fields. Published technical documents related to PSA include Patent Document 1.

CITATION LIST

Patent Literature

[Patent Document 1] Japanese Patent Application Publication No. 2012-140497

SUMMARY OF INVENTION

Technical Problem

Various properties are required of PSA depending on the purposes. Among these properties, some are difficult to simultaneously achieve at a high level such that in improving a certain property, some other property has a tendency to decrease. One example of a set of properties in a trade-off relationship is a property to deform in conformity to the surface structure of an adherend (or "surface conformity" hereinafter) and a property to resist deformation against stress (or "deformation resistance" hereinafter).

An objective of this invention is thus to provide a PSA capable of conforming well to the adherend surface and forming a bond with high deformation resistance.

Solution to Problem

This Description provides a photo-crosslinkable PSA comprising a polymer having side-chain benzophenone structures (i.e. a polymer having benzophenone structures in side chains).

The photo-crosslinkable PSA can be photo-crosslinked using the benzophenone structures after applied to an adherend and this can bring about higher deformation resistance. The PSA sheet can obtain by photo-crosslinking of the layer B. By this, when being applied to an adherend, it shows good surface conformity; and after applied, it can be photo-crosslinked to form a highly deformation-resistant bond. The PSA having good surface conformity can deform along possible contours (absorb the contours) on an adherend surface to achieve suitably tight adhesion to the adherend surface.

Among adherends for PSA, some are susceptible to so-called outgassing under conditions such as in a high-temperature environment. With respect to such an adherend, even if bubble-free good adhesion is once achieved between PSA and the adherend, subsequent outgassing of the adherend may accumulate to newly form bubbles at the interface between the PSA and the adherend. Such bubble formation (foaming) may reduce the PSA's bonding area to the adherend, leading to lower reliability of the bond formed of the PSA. Thus, for a PSA expected to be applied to an adherend that is likely to outgas, it is desirable to have a constitution capable of inhibiting the bubble formation and durably bonding to the adherend even when stored in a high-temperature environment after applied to the adherend. The bubbles are formed, accompanying deformation of PSA. Thus, enhanced deformation resistance of the PSA may help inhibit bubble formation. In the photo-crosslinkable PSA disclosed herein, the PSA's deformation resistance can be enhanced by photo-crosslinking following application to adherends; and therefore, the photo-crosslinkable PSA can favorably combine surface conformity and bond durability.

In some embodiments of the art disclosed herein (including a photo-crosslinkable PSA, methods for producing a PSA sheet and a laminate using a photo-crosslinkable PSA, a method for producing a photo-crosslinkable PSA, and a PSA composition used for producing a photo-crosslinkable PSA; the same applies, hereinafter), the photo-crosslinkable PSA has VOC (volatile organic compounds) emissions of 500 µg/g or less. The photo-crosslinkable PSA with such low VOC emissions has less odor and is preferable from the standpoint of the environmental hygiene.

The photo-crosslinkable PSA disclosed herein can be a cured product of a PSA composition comprising an ethylenically unsaturated compound and a benzophenone structure-containing component (or a "BP-containing component" hereinafter). Non-limiting examples of the BP-containing component include a polymer having side-chain benzophenone structures (or a "BP polymer" hereinafter) a compound whose molecule has an ethylenically unsaturated group and a benzophenone structure (or an "ethylenically unsaturated BP" hereinafter). In some embodiments, as the BP-containing component, a BP polymer can be preferably used. The photo-crosslinkable PSA disclosed herein can preferably be a cured product of a PSA composition comprising an ethylenically unsaturated compound and a BP polymer.

This Description also provides a photo-crosslinkable PSA comprising two or more species of polymers varying in monomer composition of which at least one species is a BP polymer. With such a photo-crosslinkable PSA comprising two or more species of polymers, through selection and combination of these polymers, the properties of the photo-crosslinkable PSA and of the photo-crosslinked product of the photo-crosslinkable PSA (i.e. the photo-crosslinkable PSA after the photo-crosslinking process) can be suitably adjusted. The polymer comprising two or more species of polymers can be, for instance, a cured product of a PSA composition comprising an ethylenically unsaturated compound and a BP polymer. The photo-crosslinkable PSA comprising two or more species of polymers preferably has VOC emissions of 500 µg/g or less.

In some embodiments, the photo-crosslinkable PSA disclosed herein has a shear storage modulus at 80° C. (or an 80° C. shear storage modulus) Gb' (kPa) and the photo-crosslinked product has an 80° C. shear storage modulus Gc' (kPa), satisfying the next relationship Gc' (kPa)–Gb' (kPa) ≥2 kPa, with the photo-crosslinked product obtained by UV-irradiating the photo-crosslinkable PSA at a dose of 300 mW/cm$^2$ to a cumulative dose of 10000 mJ/cm$^2$ using a high-pressure mercury lamp. Hereinafter, shear storage modulus Gb' may be referred to as "pre-photo-crosslinking modulus Gb'" or simply as "modulus Gb'"; and shear storage modulus Gc' as "post-photo-crosslinking modulus Gc'" or simply as "modulus Gc'." Hereinafter, Gc' (kPa)–Gb' (kPa) (i.e. the increase in 80° C. shear storage modulus) may be referred to as "ΔG" (unit: kPa). The photo-crosslinkable PSA with ΔG'≥2 kPa is likely to favorably bring out the deformation resistance-enhancing effect by photo-crosslinking.

In some embodiments, the photo-crosslinkable PSA disclosed herein may have an 80° C. shear storage modulus Gc' (kPa) of 40 kPa or higher, determined with its photo-crosslinked product obtained by UV-irradiating the photo-crosslinkable PSA at a dose of 300 mW/cm$^2$ to a cumulative dose of 10000 mJ/cm$^2$ using a high-pressure mercury lamp. The photo-crosslinkable PSA having a post-photo-crosslinking modulus Gc' of 40 kPa or higher is preferable because when photo-crosslinked after applied to an adherend, it tends to show excellent bond durability to the adherend.

This Description provides a PSA sheet having a PSA layer formed from a photo-crosslinkable PSA disclosed herein. When being applied to an adherend, the PSA sheet shows good surface conformity with the photo-crosslinkable PSA layer; and after applied, the photo-crosslinkable PSA can be photo-crosslinked to form a highly deformation-resistant bond.

In some embodiments, the PSA sheet may have a peel strength of 1.0 N/10 mm or greater, determined by the procedure shown below. The PSA sheet showing such a peel strength can favorably achieve a highly reliable bond.

Procedure for Measuring Peel Strength

The surface of the PSA layer is press-bonded to a glass plate with a 2 kg rubber roller moved back and forth once. The resultant is autoclaved (50° C., 0.5 MPa, 15 min) and then UV-irradiated at a dose of 300 mW/cm$^2$ to a cumulative dose of 10000 mJ/cm$^2$ using a high-pressure mercury lamp. Subsequently, in the atmosphere at 25° C., at a tensile speed of 300 mm/min at a peel angle of 180°, while the PSA sheet is peeled from the glass plate, the peel strength is measured.

This Description provides a laminate production method comprising the following steps in the following order: layering a member and a photo-crosslinkable PSA disclosed herein, and allowing reaction of the benzophenone structures to cause photo-crosslinking of the photo-crosslinkable PSA. According to this method, when layering the photo-crosslinkable PSA on the member, the photo-crosslinkable PSA can conform well to the surface structure of the member; and after layered, the photo-crosslinkable PSA can be enhanced in deformation resistance by photo-crosslinking. Thus, it is possible to obtain a laminate in which the member and the photo-crosslinked product of the photo-crosslinkable PSA are reliably bonded together.

This Description provides a photo-crosslinkable PSA production method comprising a step of obtaining a PSA composition comprising a BP polymer (A) and an ethylenically unsaturated compound (B), and a step of irradiating the PSA composition with active energy rays. The irradiation of active energy rays is preferably performed to allow reaction of the ethylenically unsaturated group of the ethylenically unsaturated compound (B) while allowing the benzophenone structures of the BP polymer (A) to remain (unreacted). By this, a BP polymer-containing photo-crosslinkable PSA can be obtained as the active energy ray-cured product of the PSA composition. The production method can be preferably employed as the method for producing a photo-crosslinkable PSA disclosed herein.

In some embodiments, the PSA composition may comprise, as the ethylenically unsaturated compound (B), a compound (B1) having one ethylenically unsaturated group. According to the PSA composition in such an embodiment, through selection of a species of compound (B1) and an amount thereof, the properties of the photo-crosslinkable PSA formed from the composition can be suitably adjusted.

In some embodiments, the PSA composition may comprise, as the ethylenically unsaturated compound (B), a compound (B2) having two or more ethylenically unsaturated groups. According to the PSA composition in such an embodiment, through selection of a species of compound (B2) and an amount thereof, the properties of the photo-crosslinkable PSA formed from the composition can be suitably adjusted.

In some embodiments, the PSA composition may further comprise a photoinitiator (C). With the use of photoinitiator (C), the reaction of ethylenically unsaturated group of the ethylenically unsaturated compound (B) can be accelerated. As the photoinitiator (C), it is preferable to use a compound that absorbs 300 nm to 500 nm wavelength light to generate radicals. The wavelength that excites benzophenone structures is generally shorter than 300 nm. Thus, by using a photoinitiator that absorbs light with 300 nm or longer wavelength (or "≥300 nm wavelength light" hereinafter) to generate radicals, the reaction of ethylenically unsaturated groups can be effectively accelerated while allowing benzophenone structures to remain.

As the active energy rays irradiated on the PSA composition, it is preferable to use, for instance, UV rays essentially free of a component with a wavelength below 300 nm (or a "<300 nm wavelength component" hereinafter). With such UV rays, the PSA composition can be cured by allowing the ethylenically unsaturated groups to react while allowing the benzophenone structures to remain so as to favorably produce a BP polymer-containing photo-crosslinkable PSA.

This Description provides a PSA composition used for producing a BP polymer-containing photo-crosslinkable PSA. The PSA composition comprises a BP polymer (A) and an ethylenically unsaturated compound (B). By allowing the ethylenically unsaturated group of the ethylenically unsaturated compound (B) to react while allowing the benzophenone structures of the BP polymer (A) to remain, the PSA composition can be cured to produce the photo-crosslinkable PSA. The PSA composition can be cured, for instance, by irradiating the PSA composition with active energy rays.

In some embodiments, the PSA composition can comprise a photoinitiator (C) that absorbs 300 nm to 500 nm wavelength light to generate radicals. With the use of such a photoinitiator (C), the reaction of ethylenically unsaturated groups can be effectively accelerated while allowing benzophenone structures to remain.

In some embodiments, in the PSA composition, of the entire monomers forming the PSA composition, a compound having two or more ethylenically unsaturated groups preferably has a weight fraction below 5% by weight. The PSA composition having such a composition tends to form a photo-crosslinkable PSA showing good surface conformity before photo-crosslinked.

The scope of the invention for which the present international patent application seeks patent protection includes a suitable combination of the respective features described above.

DESCRIPTION OF EMBODIMENTS

Figure 1:
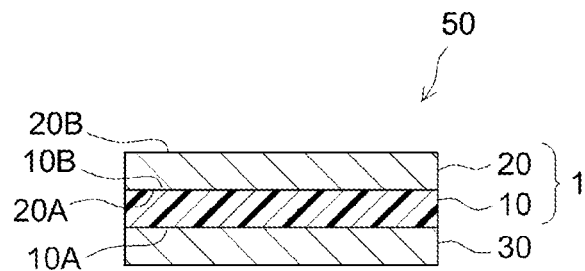
FIG. 1 shows a cross-sectional diagram schematically illustrating the PSA sheet according to an embodiment.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymer derived from a starting monomer mixture including more than 50% (preferably more than 70%, e.g., more than 90%) acrylic monomer by weight. The acrylic monomer refers to a monomer having at least one (meth)acryloyl group per molecule. As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

As used herein, the term "ethylenically unsaturated compound" refers to a compound having at least one ethylenically unsaturated group per molecule. Examples of the ethylenically unsaturated group include (meth)acryloyl group, vinyl group and allyl group. Hereinafter, a compound having one ethylenically unsaturated group may be referred to as a "monofunctional monomer" and a compound having two or more ethylenically unsaturated groups as a "polyfunctional monomer." Among polyfunctional monomers, a compound having X number of ethylenically unsaturated groups may be written as a "X-functional monomer."

As used herein, that a PSA composition comprises an ethylenically unsaturated compound means that it comprises the ethylenically unsaturated compound as a partial polymer, unless otherwise noted. Such a partial polymer is typically a mixture comprising the ethylenically unsaturated compound (unreacted monomer) whose ethylenically unsaturated group is unreacted and the ethylenically unsaturated compound whose ethylenically unsaturated group has polymerized.

As used herein, the entire monomers forming a PSA composition refers to the total quantity of monomers forming the polymer in the PSA composition and monomers included as unreacted monomers in the PSA composition. In typical, the composition of monomers forming the PSA composition generally corresponds to the composition of monomers in the photo-crosslinkable PSA formed from the PSA composition and the composition of monomers forming the photo-crosslinked product.

As used herein, the concept of "active energy ray" encompasses light such as UV rays, visible rays and infrared rays as well as radioactive rays such as $\alpha$ rays, $\beta$ rays, $\gamma$ rays, electron rays, neutron rays and X rays.

Photo-Crosslinkable PSA

This Description provides a photo-crosslinkable PSA comprising a polymer (BP polymer) having side-chain benzophenone structures. The photo-crosslinkable PSA meets at least one of the following: being a cured product of a PSA composition comprising an ethylenically unsaturated compound and a BP-containing component; having VOC emissions of 500 µg/g or less; and at least one of the two species of polymers is the BP polymer.

BP Polymer

Favorable examples of the BP polymer (including a BP polymer in a photo-crosslinkable PSA disclosed herein and a BP polymer usable as a component of a PSA composition for producing the photo-crosslinkable PSA) in the art disclosed herein include an acrylic polymer having side-chain benzophenone structures. The BP polymer may have or may be free of ethylenically unsaturated groups. In some embodiments, the BP polymer is preferably essentially free of ethylenically unsaturated groups.

As used herein, the term "benzophenone structure" (or "BP") refers to a diaryl ketone structure represented by the general formula $Ar^1$—(C=O)—$Ar^2$— or —$Ar^3$—(C=O)—$Ar^2$—. Here, $Ar^1$ in the general formula is selected among phenyl groups that may have substituents. In the general formulas, $Ar^2$ and $Ar^3$ are individually selected among phenylene groups that may have substituents. $Ar^2$ and $Ar^3$ can be the same or different. The BP-containing component refers to a compound having at least one benzophenone structure in the molecule. The benzophenone structure can be excited by UV irradiation; and when excited, it can abstract a hydrogen radical from another molecule or other part(s) of the molecule.

In the photo-crosslinkable PSA disclosed herein, with the inclusion of the side-chain-BP-containing polymer (BP polymer), by exciting benzophenone structures, a cross-linked structure can be formed utilizing the hydrogen radical abstraction reaction. The side-chain-BP-containing polymer is preferably a polymer having side-chain benzophenone structures with general formula $Ar^1$—(C=O)—$Ar^2$— wherein $Ar^1$ is a phenyl group that may have a substituent and $Ar^2$ is a phenylene group that may have a substituent in. When at least one between $Ar^1$ and $Ar^2$ has one or more substituents, the substituents can be individually selected from the group consisting of alkoxy groups (e.g. alkoxy groups with one to three carbon atoms, preferably a methoxy group), halogen atoms (e.g. F, Cl, Br, etc., preferably Cl or Br), hydroxy group, amino group and carboxy group while not limited to these.

The BP polymer in the art disclosed herein may have side chains whose benzophenone structures as described above are bonded to the main chain directly or via one, two or more structures such as an ester bond and oxyalkylene structures. A favorable example of the BP polymer is a polymer comprising a repeat unit derived from an ethylenically unsaturated BP. The repeat unit can be a polymer residue resulting from reaction of the ethylenically unsaturated group of the corresponding ethylenically unsaturated BP.

Examples of the ethylenically unsaturated BP include, but are not limited to, acryloyloxybenzophenones that may have substituents, such as 4-acryloyloxybenzophenone, 4-acryloyloxy-4'-methoxybenzophenone, 4-acryloyloxyethoxy-4'-methoxybenzophenone, 4-acryloyloxy-4'-bromobenzophenone and 2-hydroxy-4-acryloyloxybenzophenone; acryloyloxyalkoxybenzophenones that may have substituents, such as 4-[(2-acryloyloxy)ethoxy]benzophenone and 4-[(2-acryloyloxy)ethoxy]-4'-bromobenzophenone; methacryloyloxybenzophenones that may have substituents, such as 4-methacryloyloxybenzophenone, 4-methacryloyloxy-4'-methoxybenzophenone, 4-methacryloyloxy-4'-bromobenzophenone, 4-methacryloyloxyethoxy-4'-bromobenzophenone and 2-hydroxy-4-methacryloyloxybenzophenone; methacryloyloxyalkoxybenzophenones that may have substituents, such as 4-[(2-methacryloyloxy)ethoxy]benzophenone and 4-[(2-methacryloyloxy)ethoxy]-4'-methoxybenzophenone; vinylbenzophenones that may have substituents, such as 4-vinylbenzophenone, 4'-bromo-3-vinylbenzophenone, 2-hydroxy-4-methoxy-4'-vinylbenzophenone. As the ethylenically unsaturated BP, solely one species or a combination of two or more species can be used to prepare a polymer (PB). As for the ethylenically unsaturated BP, a commercial product can be used or it can be synthesized by a known method. From the standpoint of the reactivity, etc., it is preferable to use an ethylenically unsaturated BP having a (meth)acryloyl group, that is, an ethylenically unsaturated BP that is an acrylic monomer.

The BP polymer can be a copolymer having the repeat unit derived from the ethylenically unsaturated BP and a repeat unit derived from an ethylenically unsaturated compound (or "other monomer" hereinafter) that is not an ethylenically unsaturated BP. Such a BP polymer can be a copolymer of monomers comprising the ethylenically unsaturated BP and the other monomer. In some embodiments, as the other monomer, one, two or more species of acrylic monomers can be preferably used. Favorable examples of the BP polymer include an acrylic BP polymer in which an acrylic monomer accounts for more than 50% (preferably more than 70%, e.g. more than 90%) by weight of the monomers forming the BP polymer.

In some embodiments, the BP polymer-forming monomers may include, as the other monomer, one, two or more species selected among alkyl (meth)acrylates having alkyl groups. Hereinafter, an alkyl (meth)acrylate having a ester-terminal linear or branched alkyl group with an X or higher and Y or lower number of carbon atoms may be referred to as a "$C_{X-Y}$ alkyl (meth)acrylate." The BP polymer-forming monomers preferably comprise, as the other monomer, at least a $C_{1-20}$ alkyl (meth)acrylate, more preferably a $C_{4-20}$ alkyl (meth)acrylate and yet more preferably a $C_{4-18}$ alkyl (meth)acrylate (e.g. $C_{4-9}$ alkyl acrylate).

Non-limiting specific examples of the $C_{1-20}$ alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate. Particularly preferable alkyl (meth)acrylates include n-butyl acrylate (BA), 2-ethylhexyl acrylate (2EHA) and isononyl acrylate. Other specific examples of alkyl (meth)acrylates that can be preferably used include n-butyl methacrylate (BMA), 2-ethylhexyl methacrylate (2EHMA) and isostearyl acrylate (iSTA). As the alkyl (meth)acrylate, solely one species or a combination of two or more species can be used. The BP polymer-forming monomers may include, as the other monomer, one, two or more species selected among the copolymerizable monomers described later.

The photo-crosslinkable PSA can be a photo-crosslinkable acrylic PSA in which an acrylic monomer accounts for more than 50% (preferably more than 70%, e.g., more than 90%) by weight of the entire monomers forming the photo-crosslinkable PSA. The photo-crosslinkable acrylic PSA forms a photo-crosslinked acrylic product by photo-crosslinking. With respect to the photo-crosslinkable acrylic PSA, the photo-crosslinked product can have good transparency. Thus, for instance, it can be preferably used for optical applications.

The weight average molecular weight (Mw) of BP polymer is not particularly limited. For instance, it can be about $0.5 \times 10^4$ to $500 \times 10^4$. From the standpoint of the cohesion of the photo-crosslinkable PSA, the handling properties of the PSA sheet having the photo-crosslinkable PSA, etc., in some embodiments, the BP polymer's Mw is usually suitably $1 \times 10^4$ or higher, preferably $5 \times 10^4$ or higher, possibly $10 \times 10^4$ or higher, $15 \times 10^4$ or higher, or even $20 \times 10^4$ or higher. From the standpoint of the photo-crosslinkable PSA's surface conformity to adherends (e.g. an optical member), the BP polymer in the photo-crosslinkable PSA usually has a Mw of suitably $200 \times 10^4$ or lower, preferably $150 \times 10^4$ or lower, possibly $100 \times 10^4$ or lower, $70 \times 10^4$ or lower, or even $50 \times 10^4$ or lower. In some embodiments, the BP polymer's Mw can be $40 \times 10^4$ or lower, $30 \times 10^4$ or lower, $25 \times 10^4$ or lower, or even $20 \times 10^4$ or lower.

As used herein, the weight average molecular weight (Mw) of a polymer refers to a value based on polystyrene standards determined by gel permeation chromatography (GPC). As the GPC system, for instance, model name HLC-8320 GPC (column: TSKgelGMH-H(S); available from Tosoh Corporation) can be used.

In the art disclosed herein, the glass transition temperature (Tg) of BP polymer is not particularly limited. The BP polymer's Tg can be, for instance, −80° C. or higher and 150° C. or lower, −80° C. or higher and 50° C. or lower, or −80° C. or higher and 10° C. or lower. From the standpoint of the surface conformity of the photo-crosslinkable PSA, in some embodiments, the BP polymer's Tg is suitably below 0° C., preferably −10° C. or lower, possibly −20° C. or lower, −30° C. or lower, −35° C. or lower, −40° C. or lower, or even −50° C. or lower. From the standpoint of the photo-crosslinkable PSA's cohesion and post-crosslinking deformation resistance (e.g. bond durability to adherends), the BP polymer's Tg is usually advantageously −75° C. or higher, possibly −70° C. or higher, or even −65° C. or higher. In some embodiments, the BP polymer's Tg can be −55° C. or higher, −45° C. or higher, or even −40° C. or higher. The BP polymer's Tg can be adjusted through the types of monomers forming the BP polymer and their amounts.

As used herein, the glass transition temperature (Tg) of a polymer refers to the glass transition temperature determined by the Fox equation based on the composition of monomers forming the polymer. The Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

| | |
|---|---|
| 2-ethylhexyl acrylate | −70° C. |
| n-butyl acrylate | −55° C. |
| isostearyl acrylate | −18° C. |
| methyl acrylate | 8° C. |
| cyclohexyl acrylate | 15° C. |
| N-vinyl-2-pyrrolidone | 54° C. |
| 2-hydroxyethyl acrylate | −15° C. |
| 4-hydroxybutyl acrylate | −40° C. |
| isobornyl acrylate | 94° C. |
| acrylic acid | 106° C. |
| methacrylic acid | 228° C. |

With respect to the glass transition temperatures of homopolymers of monomers other than those listed above, values given in "Polymer Handbook" (3rd edition, John Wiley & Sons, Inc., Year 1989) are used. When the literature provides two or more values, the highest value is used. With respect to a monomer whose homopolymer glass transition temperature is not given in Polymer Handbook, the value obtained by the measurement method according to Japanese Patent Application Publication No. 2007-51271 is used. With respect to a polymer for which the nominal glass transition temperature value is provided by the manufacturer, etc., the nominal value can be used as well.

The BP polymer in the art disclosed herein preferably includes, for instance, about 0.5 mg or more of benzophenone structures per gram of polymer based on 4-benzoylphenyl acrylate standards. The amount based on 4-benzoylphenyl acrylate standards converted from the number of benzophenone structures included per gram of BP polymer may be referred to as the BP equivalent (unit: mg/g) of BP polymer. For instance, when 40 μmol of benzophenone structures are included per gram, the polymer's BP equivalent is calculated to be 10 mg/g.

From the standpoint of obtaining greater effect of crosslinking (e.g. deformation resistance enhancement by crosslinking), in some embodiments, the BP polymer usually has a BP equivalent of suitably 1 mg/g or higher, preferably 1.5 mg/g or higher, for instance, possibly 2 mg/g or higher, 5 mg/g or higher, 8 mg/g or higher, 10 mg/g or higher, 15 mg/g or higher, or even 20 mg/g or higher. In some embodiments, from the standpoint of increasing the impact resistance and peel strength of the joint formed of the photo-crosslinked product, the BP polymer usually has a BP equivalent of suitably 100 mg/g or lower, possibly 80 mg/g or lower, 60 mg/g or lower, 40 mg/g or lower, 25 mg/g or lower, or even 15 mg/g or lower. In some embodiments, the BP polymer's BP equivalent can be below 5 mg/m. The BP polymer's BP equivalent can be adjusted through the composition of monomers forming the BP polymer.

The weight ratio of BP polymer in the entire photo-crosslinkable PSA (i.e. the weight fraction of BP polymer in the photo-crosslinkable PSA) is not particularly limited. It can be selected to favorably balance the surface conformity of the photo-crosslinkable PSA and the deformation resistance of the photo-crosslinked product thereof. In some embodiments, the BP polymer has a weight fraction of, for instance, 1% by weight or higher, usually suitably 5% by weight or higher, possibly 10% by weight or higher, 15% by weight or higher, 25% by weight or higher, 30% by weight or higher, 35% by weight or higher, 45% by weight or higher, 50% by weight or higher, or even 55% by weight or higher. With increasing weight fraction of BP polymer, ΔG' described later tends to increase. The art disclosed herein can also be implemented in an embodiment where the BP polymer in the photo-crosslinkable PSA has a weight fraction of essentially 100% by weight (e.g. 99.5% by weight or higher). From the standpoint of the ease of adjusting the adhesive properties and reducing VOC, in some embodiments, the BP polymer in the photo-crosslinkable PSA can have a weight fraction of, for instance, below 99% by weight, below 95% by weight, below 85% by weight, below 70% by weight, below 60% by weight, below 50% by weight, below 40% by weight, or even below 35% by weight.

The photo-crosslinkable PSA disclosed herein preferably comprises, for instance, about 0.1 mg/g or more of benzophenone structures per gram of photo-crosslinkable PSA based on 4-benzoylphenyl acrylate standards. Hereinafter, the weight of benzophenone structures included per gram of photo-crosslinkable PSA determined based on 4-benzoylphenyl acrylate standards may be referred to as the BP equivalent (unit: mg/g) of photo-crosslinkable PSA. From the standpoint of obtaining greater effect of crosslinking (e.g. deformation resistance enhancement by crosslinking), in some embodiments, the photo-crosslinkable PSA usually has a BP equivalent of suitably 0.3 mg/g or higher, possibly 0.5 mg/g or higher, 1 mg/g or higher, 5 mg/g or higher, 10 mg/g or higher, or even 20 mg/g or higher. In some embodiments, from the standpoint of increasing the impact resistance of the joint formed of the photo-crosslinked product and reducing the internal distortion of the photo-crosslinked product, the photo-crosslinkable PSA usually has a BP equivalent of suitably 100 mg/g or lower, possibly 80 mg/g or lower, 60 mg/g or lower, 40 mg/g or lower, 25 mg/g or lower, or even 15 mg/g or lower.

The photo-crosslinkable PSA disclosed herein may be a cured product of a PSA composition comprising an ethylenically unsaturated compound and a BP-containing component. The PSA composition may include, as the BP-containing component, one, two or more species of monomers selected among ethylenically unsaturated BPs as those described above; may include a pre-synthesized BP polymer; or may include both of these. The BP polymer in the photo-crosslinkable PSA can be, for instance, the BP polymer or a modified product thereof in the PSA composition, or a species formed by copolymerization of the ethylenically unsaturated BP and other monomer(s) in the PSA composition.

The photo-crosslinkable PSA may comprise two or more species of polymers having varying monomer compositions among which at least one species of polymer is the BP polymer. The photo-crosslinkable PSA may include, as the two or more species of polymer, solely two or more species of polymers (PB) or a combination of a BP polymer and a benzophenone structure-free polymer (or "non-BP polymer" hereinafter). The non-BP polymer can be formed by using a PSA composition comprising a benzophenone structure-free ethylenically unsaturated compound and polymerizing the ethylenically unsaturated compound. From the standpoint of the compatibility, etc., the BP and non-BP polymers are preferably both acrylic polymers.

The two or more species of polymers may or may not be chemically bonded. The photo-crosslinkable PSA according to some embodiments may include at least one species of BP polymer not chemically bonded to other polymer(s) besides the BP polymer. By photo-crosslinking the benzophenone structures of the BP polymer, the photo-crosslinkable PSA can form a photo-crosslinked product in which the BP polymer and other polymer besides the BP polymer are chemically bonded.

The photo-crosslinkable PSA disclosed herein can include other components usable in PSA as necessary. The photo-crosslinkable PSA comprising such optional components can be formed using a PSA composition having the corresponding composition.

VOC Emissions

The VOC emissions of the photo-crosslinkable PSA disclosed herein is not particularly limited. The VOC emissions can be, for instance, 5000 μg/g or less, 3000 μg/g or less, or even 1000 μg/g or less. In some embodiments, the VOC emissions of the photo-crosslinkable PSA is preferably 500 μg/g or less, more preferably 300 μg/g or less, or yet more preferably 100 μg/g or less. The photo-crosslinkable PSA with less VOC emissions has less odor and is preferable from the standpoint of the environmental hygiene. The low VOC emissions of the photo-crosslinkable PSA is also preferable from the standpoint of inhibiting foaming caused by volatile organic compounds (VOC) in the photo-crosslinkable PSA and causing less contamination. The VOC emissions of a photo-crosslinkable PSA is determined by the method described below, using a suitable amount (e.g. about 1 mg to 2 mg) of the photo-crosslinkable PSA as a measurement sample. The measurement sample preferably has a thickness of 1 mm or less.

VOC Test

A test sample is placed and sealed in a 20 mL vial. The vial is then heated at 80° C. for 30 minutes and 1.0 mL of the heated gas (sample gas) is injected into a gas chromatograph (GC), using a head space autosampler (HSS). Based on the resulting gas chromatogram, the amount of gas emitted from the test sample is determined as an n-decane equivalent amount. From the resulting value, the VOC emission is determined per gram of test sample (μg/g). The n-decane equivalent amount is determined by applying a calibration curve prepared in advance for n-decane, with the intensities of emission gas obtained by GC Mass seen as equivalent to the intensities of n-decane. The HSS and GC settings are as follows:

HSS: model 7694 available from Agilent Technologies
Heating time: 30 min
Pressurization time: 0.12 min
Loop filling time: 0.12 min
Loop equilibration time: 0.05 min
Injection time: 3 min
Sample loop temperature: 160° C.
Transfer line temperature: 200° C.
GC: model 6890 available from Agilent Technologies
Column: J&W capillary column, product name DB-ffAP, available from GL Science (0.533 mm inner diameter× 30 m length, 1.0 μm thick membrane)
Column temperature: 250° C. (temperature raised at 10° C./min from 40° C. to 90° C., followed at 20° C./min to 250° C. and maintained there for 5 min)
Colum pressure: 24.3 kPa (constant flow mode)
Carrier gas: helium (5.0 mL/min)
Injection port: split (split ratio 12:1)
Injection port temperature: 250° C.
Detector: FID
Detector temperature: 250° C.

In general, VOC that can increase VOC emissions of PSA include organic solvents (e.g. residue of organic solvents in a PSA composition used for preparing photo-crosslinkable PSA), unreacted residue (e.g. unpolymerized acrylic monomer or "residual monomer" hereinafter) of an ethylenically unsaturated compound in the PSA composition. In the photo-crosslinkable PSA disclosed herein, the amount of such organic solvents and residual monomer can be reduced to a level that satisfies the aforementioned VOC emission level. The photo-crosslinkable PSA disclosed herein can form new crosslinks in the matrix using the benzophenone structures of the polymer (BP) while having such a limited residual monomer content, whereby a photo-crosslinked product with enhanced deformation resistance can be formed.

As for the VOC emissions of the photo-crosslinkable PSA disclosed herein, the lower the more preferable in principle. From the standpoint of the practicality including productivity and costs, in some embodiment, the VOC emissions can be, for instance, 10 μg/g or higher, 30 μg/g or higher, 80 μg/g or higher, 150 μg/g or higher, or even 200 μg/g or higher.

Shear Storage Modulus

In the art disclosed herein, the photo-crosslinkable PSA is not particularly limited in shear storage modulus at 30° C. (or "30° C. shear storage modulus" hereinafter) Ga'. The 30° C. shear storage modulus Ga' (kPa) of the photo-crosslinkable PSA is usually preferably above 1 kPa. Hereinafter, the shear storage modulus Ga' may be referred to as "pre-photo-crosslinking room temperature (RT) modulus Ga'" or simply "RT modulus Ga'." From the standpoint of the cohesion of the photo-crosslinkable PSA or of the handing properties (e.g. ease of processing) of the PSA sheet having a PSA layer formed from the photo-crosslinkable PSA, etc., the RT modulus Ga' is preferably above 5 kPa, more preferably above 10 kPa, possibly above 15 kPa, above 25 kPa, or even above 30 kPa. In some embodiments, the RT modulus Ga' can be above 50 kPa, above 65 kPa, or even above 75 kPa. From the standpoint of the conformity to the adherend surface structure, the RT modulus Ga' is usually suitably 500 kPa or lower, preferably 200 kPa or lower, or possibly even 100 kPa or lower. In some embodiments, the RT modulus Ga' can be below 80 kPa, or even below 60 kPa.

The RT modulus Ga' of the photo-crosslinkable PSA can be determined by dynamic viscoelastic analysis under the same conditions as for the pre-photo-crosslinking modulus Gb' described later in Examples. The RT modulus Ga' can be adjusted through the composition of the photo-crosslinkable PSA (e.g. the BP equivalent and Mw of the BP polymer, composition of BP polymer-forming monomers, the BP polymer's weight fraction), etc.

The shear storage modulus at 80° C. (or 80° C. shear storage modulus) of the photo-crosslinkable PSA forming the layer B of the PSA layer (i.e. the pre-photo-crosslinking modulus Gb') is not particularly limited. From the standpoint of the cohesion of photo-crosslinkable PSA and the handling properties (e.g. storability) of a PSA sheet having the photo-crosslinkable PSA, etc., the modulus Gb' is usually suitably above 3 kPa, preferably above 5 kPa, more preferably above 10 kPa, or possibly even above 15 kPa. In some embodiments, from the standpoint of the ease of processing the PSA sheet having the photo-crosslinkable PSA, etc., the modulus Gb' can be above 30 kPa, above 40 kPa, above 50 kPa, or even above 52 kPa. The PSA having such a modulus Gb' can be preferably used, for instance, as a PSA layer formed from the photo-crosslinkable PSA and having a thickness above 50 µm (above 70 µm or above 90 µm) or as a component of a PSA sheet having the PSA layer.

The modulus Gb' can be determined by the method described later in Examples. The modulus Gb' can be adjusted through the composition of the photo-crosslinkable PSA (e.g. the BP equivalent and Mw of the BP polymer, composition of BP polymer-forming monomers, the BP polymer's weight fraction), etc.

No particular limitations are imposed on the 80° C. shear storage modulus Gc' (kPa) (i.e. post-photo-curing modulus Gc') of the photo-crosslinked product obtained by UV-irradiating the photo-crosslinkable PSA at a dose of 300 mW/cm$^2$ to a cumulative dose of 10000 mJ/cm$^2$ using a high-pressure mercury lamp. From the standpoint of reducing cohesive failure of the joint formed of the photo-crosslinked product, the modulus Gc' is usually advantageously 15 kPa or higher, or preferably 25 kPa or higher. From the standpoint of increasing the bond durability to adherends (especially, e.g. highly outgassing adherends such as a polarizing plate), the modulus Gc' is advantageously 30 kPa or higher, preferably 35 kPa or higher, or more preferably 40 kPa or higher. In some embodiments, the modulus Gc' can be 45 kPa or higher, 50 kPa or higher, 55 kPa or higher, or even 60 kPa or higher. The modulus Gc' can be, for instance, 200 kPa or lower, 150 kPa or lower, or even 120 kPa or lower. From the standpoint of combining well-balanced bond durability to adherends and other properties (e.g. peel strength), the modulus Gc' is advantageously 100 kPa or lower, preferably 80 kPa or lower, possibly 70 kPa or lower, or even 65 kPa or lower. As for the photo-crosslinked product formed by photo-crosslinking following lamination of the photo-crosslinkable PSA on an adherend, with decreasing modulus Gc', the peel strength to the adherend tends to generally increase. In some embodiments, the modulus Gc' can be below 60 kPa, below 55 kPa, below 50 kPa, or even below 45 kPa.

More specifically, the modulus Gc' can be determined by the method described later in Examples. The modulus Gc' can be adjusted through the composition of the photo-crosslinkable PSA (e.g. the BP equivalent and Mw of the BP polymer, composition of BP polymer-forming monomers, the BP polymer's weight fraction), etc.

No particular limitations are imposed on the relationship between the modulus Gb' of the photo-crosslinkable PSA and the modulus Gc' of the photo-crosslinked product thereof. In typical, Gc' (kPa)−Gb' (kPa)>0 (kPa) is satisfied. ΔG' is, for instance, possibly 0.5 kPa or higher, preferably 1 kPa or higher, or more preferably 2 kPa or higher. The photo-crosslinkable PSA having ΔG' of 2 kPa or higher is likely to suitably bring about the deformation resistance-enhancing effect by photo-crosslinking. From the standpoint of obtaining greater effect of photo-crosslinking, in some embodiments, ΔG' is possibly 3 kPa or higher, 5 kPa or higher, for instance, preferably 8 kPa or higher, also possibly 10 kPa or higher, 15 kPa or higher, 20 kPa or higher, 25 kPa or higher, or even 30 kPa or higher. The maximum ΔG' is not particularly limited. From the standpoint of combining well-balanced surface conformity at time of application to adherends and post-photo-crosslinking deformation resistance, ΔG' is usually suitably 150 kPa or lower, preferably 100 kPa or lower, 80 kPa or lower, 65 kPa or lower, 50 kPa or lower, 40 kPa or lower.

Gel Fraction

The gel fraction of the photo-crosslinkable PSA disclosed herein is not particularly limited. From the standpoint of the cohesion of the photo-crosslinkable PSA and the handling properties of a PSA sheet having a PSA layer formed from the photo-crosslinkable PSA, it is usually suitably 5% or higher, preferably 15% or higher, possibly 25% or higher, or even 35% or higher. The photo-crosslinkable PSA theoretically has a gel fraction of 100% or lower. From the standpoint of the conformity to the adherend surface, the gel fraction of the photo-crosslinkable PSA is preferably below 85%, possibly below 70%, below 55%, or even below 40%.

The gel fraction is determined by the following method: In particular, an approximately 0.5 g measurement sample is accurately weighed and the weight is recorded as W1. The measurement sample is wrapped in a porous PTFE (polytetrafluoroethylene) sheet and suspended in ethyl acetate at room temperature for one week. Subsequently, the measurement sample is allowed to dry and the weight W2 of the ethyl acetate-insoluble portion is determined. W1 and W2 are substituted into the next equation to determine the gel fraction:

$$Gel\ \text{fraction}\ (\%) = W2/W1 \times 100$$

As the porous PTFE sheet, trade name NITOFLON® NTF 1122 available from Nitto Denko Corporation or a similar product can be used.

In some embodiments of the photo-crosslinkable PSA disclosed herein, the photo-crosslinked product obtained by UV-irradiating the photocurable PSA at a dose of 300 mW/cm$^2$ to a cumulative dose of 3000 mJ/cm$^2$ using a high-pressure mercury lamp has a gel fraction of, for instance, possibly 70% or higher, preferably 90% or higher, also possibly 95% or higher, or even 98% or higher. The gel fraction of the photo-crosslinked product is theoretically 100% or lower. The gel fraction is determined by the method described above.

Formation of Photo-Crosslinked Product

The photo-crosslinkable PSA disclosed herein can be photo-crosslinked by irradiation of UV rays comprising a wavelength component capable of exciting benzophenone structures (or a "BP-excitation wavelength component" hereinafter). A preferable light source can radiate UV rays comprising a component with a wavelength below 300 nm (or a "<300 nm wavelength component" hereinafter). Examples of the light source include, but are not limited to, a high-pressure mercury lamp, low-pressure mercury lamp, metal halide lamp and super UV lamp. The light irradiated from the light source may comprise a component with 300 nm or longer wavelength (or a "≥300 nm wavelength component" hereinafter).

Light sources capable of radiating UV rays that are free of a BP-excitation wavelength component (e.g. a <300 nm wavelength component) or low in amount thereof include blacklight and UV-LED lamp. These light sources can be preferably used to allow reaction (polymerization or curing) of ethylenically unsaturated groups by photoirradiation carried out in the presence of benzophenone structures. In UV irradiation to carry out the reaction of ethylenically unsaturated groups, a photoinitiator described later can be used to accelerate the reaction.

The photo-crosslinkable PSA disclosed herein may have a composition essentially free of a photoinitiator that absorbs ≥300 nm wavelength light to generate radicals. For instance, it may have a composition essentially free of a photoinitiator that absorbs ≥380 nm (especially ≥400 nm) visible light to generate radicals. This can be advantageous from the standpoint of the optical properties of the photo-crosslinkable PSA. Being free of a photoinitiator that absorbs ≥300 nm wavelength light to generate radicals refers to being free of the photoinitiator in the state capable of generating radicals (a state having sites cleavable by the light), allowing the inclusion of cleaved residue of the photoinitiator. The photo-crosslinkable PSA according to a preferable embodiment is essentially free of a photoinitiator comprising a phosphorous atom in the molecule (or a "P-containing photoinitiator" hereinafter). The photo-crosslinkable PSA disclosed herein can be essentially free of a P-containing photoinitiator and cleaved residue of the photoinitiator.

PSA Composition

This Description provides a PSA composition comprising a side-chain-BP-containing polymer (BP polymer) (A) and an ethylenically unsaturated compound (B). Such a PSA composition can be used in producing a photo-crosslinkable PSA disclosed herein. In some embodiments, the PSA composition can be an acrylic PSA composition in which an acrylic monomer accounts for more than 50% (preferably more than 70%, e.g., more than 90%) by weight of the entire monomers forming the PSA composition.

As the BP polymer (A) used as a component of the PSA composition, it is possible to use the same species as the BP polymer in the photo-crosslinkable PSA. Thus, redundant details are omitted.

Ethylenically Unsaturated Compound (B)

Examples of the compound usable as the ethylenically unsaturated compound (B) include the alkyl (meth)acrylate and the ethylenically unsaturated BP described above. Among these, it is preferable to use at least an alkyl (meth)acrylate (e.g. a $C_{1-20}$ alkyl (meth)acrylate, more preferably a $C_{4-18}$ alkyl (meth)acrylate, or yet more preferably a $C_{4-9}$ alkyl acrylate). Particularly preferable alkyl (meth)acrylates include n-butyl acrylate (BA) and 2-ethylhexyl acrylate (2EHA). Other specific examples of alkyl (meth)acrylates that can be preferably used include isononyl acrylate, n-butyl methacrylate (BMA), 2ethylhexyl methacrylate (2EHMA) and isostearyl acrylate (iSTA). As the alkyl (meth)acrylate, solely one species or a combination of two or more species can be used. In some embodiments, the ethylenically unsaturated compound (B) preferably comprises one or each between n-butyl acrylate (BA) and 2-ethylhexyl acrylate (2EHA). In an embodiment, it more preferably comprises at least 2EHA. In another embodiment, it more preferably comprises at least BA.

In some embodiments, the ethylenically unsaturated compound (B) may include at least 40% (by weight) $C_{4-9}$ alkyl acrylate. The ratio of alkyl $C_{4-9}$ acrylate in the ethylenically unsaturated compound (B) can be, for instance, 50% by weight or higher, 60% by weight or higher, or even 65% by weight or higher. From the standpoint of enhancing the cohesion of the photo-crosslinkable PSA, the ratio of $C_{4-9}$ alkyl acrylate in the ethylenically unsaturated compound (B) is usually suitably 99.5% by weight or lower, 95% by weight or lower, 85% by weight or lower, 70% by weight or lower, or even 60% by weight or lower.

Other examples of the compound usable as the ethylenically unsaturated compound (B) include an ethylenically unsaturated compound (copolymerizable monomer) that can be copolymerized with an alkyl (meth)acrylate. As the copolymerizable monomer, it is suitable to use a monomer having a polar group (e.g. carboxy group, hydroxy group, nitrogen atom-containing ring, etc.). For instance, the polar group-containing monomer can be useful in introducing crosslinking points into the polymer comprising a repeat unit derived from the monomer or in increasing the cohesive strength of the photo-crosslinkable PSA. For the copolymerizable monomer, solely one species or a combination of two or more species can be used.

Non-limiting specific examples of the copolymerizable monomer include those indicated below.

Carboxy group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride.

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate.

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate.

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether.

Cyano group-containing monomers: for example, acrylonitrile and methacrylonitrile.

Isocyanato group-containing monomers: for example, 2-(meth)acryloyloxyethyl isocyanate, (meth)acryloyl isocyanate and m-isopropenyl-α,α-dimethylbenzyl isocyanate.

Amido group-containing monomers: for example, (meth)acrylamide; N,N-dialkyl (meth)acrylamides such as N,N-dimethyl(meth)acrylamide, N,N-diethyl(meth)acrylamide, N,N-dipropyl(meth)acrylamide, N,N-diisopropyl(meth) acrylamide, N,N-di(n-butyl)(meth)acrylamide and N,N-di(t-butyl) (meth)acrylamide; N-alkyl (meth)acrylamides such as N-ethyl(meth)acrylamide, N-isopropyl(meth)acrylamide, N-butyl(meth)acrylamide and N-n-butyl(meth)acrylamide; N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl) (meth)acrylamide, N-(1-hydroxypropyl)(meth)acrylamide, N-(3-hydroxypropyl)(meth)acrylamide, N-(2-hydroxybutyl) (meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl (meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Amino group-containing monomers: for example, aminoethyl (meth)acrylate, N,N-dimethylaminoethyl (meth)acrylate and t-butylaminoethyl (meth)acrylate.

Epoxy group-containing monomers: for example, glycidyl (meth)acrylate, methylglycidyl (meth)acrylate, and allyl glycidyl ether.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam).

Monomers having a succinimide backbone: for example, N-(meth)acryloyloxy methylene succinimide, N-(meth) acryloyl-6-oxy hexamethylene succinimide and N-(meth) acryloyl-8-oxy hexamethylene succinimide.

Maleimides: for example, N-cyclohexylmaleimide, N-isopropylmaleimide, N-laurylmaleimide and N-phenylmaleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide.

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate.

Alkoxy group-containing monomers: for example, an alkoxyalkyl (meth)acrylate such as 2-methoxyethyl (meth) acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; and an alkoxy alkylene glycol (meth)acrylate (e.g. alkoxy poly (alkylene glycol) (meth)acrylate) such as methoxy ethylene glycol (meth)acrylate, methoxy propylene glycol (meth) acrylate, methoxy poly(ethylene glycol) (meth)acrylate, methoxy poly(ethylene glycol) (meth)acrylate and methoxy poly(propylene glycol) (meth)acrylate.

Alkoxysilyl group-containing monomers; for example, an alkoxysilyl group-containing (meth)acrylate such as (3-(meth)acryloxypropyl)trimethoxysilane, (3-(meth)acryloxypropyl)triethoxysilane, (3-(meth)acryloxypropyl)methyldimethoxysilane and (3-(meth)acryloxypropyl) methyldiethoxysilane; and an alkoxysilyl group-containing vinyl compound such as vinyltrimethoxysilane and vinyltriethoxysilane.

Vinyl esters: for example, vinyl acetate and vinyl propionate.

Vinyl ethers: for example, vinyl alkyl ethers such as methyl vinyl ether and ethyl vinyl ether.

Aromatic vinyl compounds: for example, styrene, α-methylstyrene and vinyl toluene.

Olefins: for example, ethylene, butadiene, isoprene and isobutylene.

(Meth)acrylic esters having an alicyclic hydrocarbon group: for example, cyclopentyl (meth)acrylate, cyclohexyl (meth)acrylate, isobornyl (meth)acrylate, dicyclopentanyl (meth)acrylate, and adamantyl (meth)acrylate.

(Meth)acrylic esters having an aromatic hydrocarbon group: for example, an aromatic hydrocarbon group-containing (meth)acrylate such as phenyl (meth)acrylate, phenoxyethyl (meth)acrylate and benzyl (meth)acrylate.

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth) acrylates such as silicone (meth)acrylate, (meth)acrylic esters obtained from terpene compound derivative alcohols and the like.

When using such a copolymerizable monomer, its amount used is not particularly limited. It is usually suitably at least 0.01% by weight of the entire monomers forming the PSA composition. From the standpoint of obtaining greater effect of the use of the copolymerizable monomer, the amount of copolymerizable monomer used (i.e. the weight fraction of the copolymerizable monomer in the entire monomers) can be 0.1% by weight or more of the entire monomers, or even 0.5% by weight or more. For easy balancing of adhesive properties, the amount of copolymerizable monomer used is suitably 50% by weight or less of the entire monomers, or preferably 40% by weight or less.

In some embodiments, the copolymerizable monomer may include a monomer having a nitrogen atom (N-containing monomer). The use of N-containing monomer may preferably increase the cohesive strength of photo-curable PSA and the post-photo-crosslinking peel strength. A favorable example of the N-containing monomer is a monomer having a nitrogen atom-containing ring. As the monomer having a nitrogen atom-containing ring, the examples listed earlier and the like can be used. For instance, it is possible to use a cyclic N-vinyl amide represented by a general formula (1):

[Chem 1]

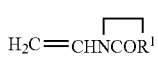

(1)

Here, in the general formula (1), $R^1$ is a divalent organic group, specifically $—(CH_2)_n—$; n is an integer between 2 and 7 (preferably 2, 3 or 4). In particular, N-vinyl-2-pyrrolidone can be preferably used. Other favorable examples of the nitrogen atom-containing monomer include (meth)acrylamides.

When using a N-containing monomer (preferably a monomer having a nitrogen atom-containing ring such as N-vinyl cyclic amide and N-(meth)acryloyl amide), the amount used is not particularly limited. Of the entire monomers, it can be, for instance, 1% by weight or more, 2% by weight or more, 3% by weight or more, even 5% by weight or more, or even 7% by weight or more. In an embodiment, the amount of N-containing monomer used can be 10% by weight or more, 15% by weight or more, or even 20% by weight or more of all monomers. The amount of the nitrogen atom-containing monomer used is suitably, for instance, 40% by weight or less of all monomers, possibly 35% by weight or less, 30% by weight or less, or even 25% by weight or less. In another embodiment, the amount of the nitrogen atom-containing monomer used can be, for instance, 20% by weight or less, 15% by weight or less, less than 10% by weight, or even less than 6% by weight of all monomers.

In some embodiments, the copolymerizable monomer may include a hydroxy group-containing monomer. With the use of hydroxy group-containing monomer, the photo-crosslinkable PSA's cohesive strength and crosslinking degree (e.g. crosslinking by an isocyanate crosslinking agent) can be favorably adjusted. When using a hydroxy group-containing monomer, its amount used can be, for instance, 0.01% by weight or more, 0.1% by weight or more, 0.5% by weight or more, 1% by weight or more, 5% by weight or more, or even 10% by weight or more of the entire monomers. From the standpoint of reducing the water absorption of the photo-crosslinkable PSA or photo-crosslinked product thereof, in some embodiments, the amount of hydroxy group-containing monomer used is, for instance, suitably 40% by weight or less of the entire monomers; it can be 30% by weight or less, 25% by weight or less, or even 20% by weight or less. In another embodiment, the amount of hydroxy group-containing monomer used can be, for instance, 15% by weight or less of all monomers, 10% by weight or less, or even 5% by weight or less. Alternatively, as the copolymerizable monomer, hydroxy group-containing monomers may not be used, either.

In some embodiments, the ratio of carboxy group-containing monomer in the entire monomers can be, for instance, 2% by weight or lower, 1% by weight or lower, or even 0.5% by weight or lower (e.g. below 0.1% by weight). The PSA composition may be essentially free of a carboxy group-containing monomer as a component thereof. Here, being essentially free of a carboxy group-containing monomer means that a carboxy group-containing monomer is not used at least intentionally. This may be advantageous from the standpoint of the anti-metal corrosion properties of the photo-crosslinkable PSA formed from the PSA composition and the photo-crosslinked product thereof.

In some embodiments, the copolymerizable monomer may include an alicyclic hydrocarbon group-containing (meth)acrylate. This can increase the PSA's cohesive strength and the post-photo-crosslinking peel strength. As the alicyclic hydrocarbon group-containing (meth)acrylate, the aforementioned examples and the like can be used. For instance, cyclohexyl acrylate and isobornyl acrylate can be preferably used. When using an alicyclic hydrocarbon group-containing (meth)acrylate, its amount used is not particularly limited. For instance, of the entire monomers, it can be 1% by weight or greater, 3% by weight or greater, or even 5% by weight or greater. In an embodiment, the amount of alicyclic hydrocarbon group-containing (meth)acrylate used can be 10% by weight or more, 15% by weight or more, more than 20% by weight, or even more than 25% by weight of the entire monomers. The maximum amount of alicyclic hydrocarbon group-containing (meth)acrylate used is suitably about 40% by weight or less, for instance, possibly 30% by weight or less, or also 25% by weight or less (e.g. 15% by weight or less, or even 10% by weight or less).

In some embodiments, the copolymerizable monomer may include an alkoxysilyl group-containing monomer. A typical example of the alkoxysilyl group-containing monomer is an ethylenically unsaturated compound having at least one (preferably two or more, e.g. two or three) alkoxysilyl group(s) per molecule. Specific examples thereof are as described earlier. For the alkoxysilyl group-containing monomer, solely one species or a combination of two or more species can be used. By using the alkoxysilyl group-containing monomer, a crosslinked structure formed by condensation reaction of silanol groups (silanol condensation) can be introduced into the photo-crosslinkable PSA. The alkoxysilyl group-containing monomer may help increase the peel strength to adherends.

When using an alkoxysilyl group-containing monomer, its amount used is not particularly limited. In some embodiments, of the entire monomers forming the PSA composition, the amount of alkoxysilyl group-containing monomer used can be, for instance, 0.005% by weight or higher, usually suitably 0.01% by weight or higher, possibly 0.03% by weight or higher, 0.05% by weight or higher, or even 0.07% by weight or higher. From the standpoint of obtaining greater effect of the use, it can be above 0.1% by weight, above 0.2% by weight, or even above 0.3% by weight. From the standpoint of the surface conformity of the photo-crosslinkable PSA, of the entire monomers, the amount of alkoxysilyl group-containing monomer used is usually suitably 1.0% by weight or lower, possibly 0.5% by weight or lower, 0.35% by weight or lower, 0.25% by weight or lower, 0.1% by weight or lower, or even below 0.1% by weight.

Yet other examples of the compound usable as the ethylenically unsaturated compound (B) include polyfunctional monomers. With the polyfunctional monomer-containing PSA composition, when curing the composition to prepare a photo-crosslinkable PSA, by allowing the polyfunctional monomer to react, it is possible to obtain a photo-crosslinkable PSA crosslinked with the polyfunctional monomer.

Examples of the polyfunctional monomer include bifunctional monomers such as 1,6-hexanediol di(meth)acrylate, 1,12-dodecanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, allyl (meth)acrylate, vinyl (meth)acrylate and divinylbenzene; trifunctional or higher polyfunctional monomers such as trimethylolpropane tri(meth)acrylate, pentaerythritol tri(meth)acrylate, tetramethylol methane tri (meth)acrylate and dipentaerythritol hexa(meth)acrylate; and others such as epoxy acrylate, polyester acrylate and urethane acrylate. Particularly preferable examples include 1,6-hexanediol di(meth)acrylate, trimethylolpropane tri (meth)acrylate and dipentaerythritol hexa(meth)acrylate. For the polyfunctional monomer, solely one species or a combination of two or more species can be used.

When using a polyfunctional monomer, its amount used is not particularly limited. It can be selected so that the resulting photo-crosslinkable PSA shows favorable properties. In some embodiments, the polyfunctional monomer can be used in an amount less than 5.0% by weight of the entire monomers forming the PSA composition. By this, formation of an excessively crosslinked structure can be avoided while the photo-crosslinkable PSA is being formed (i.e. in the pre-photo-crosslinking stage) and the surface conformity of the photo-crosslinkable PSA can be enhanced. Of the entire monomers, the amount of polyfunctional monomer used can be, for instance, 4.0% by weight or lower, 3.0% by weight or lower, 2.0% by weight or lower, 1.0% by weight or lower, 0.5% by weight or lower, or even 0.3% by weight or lower. Polyfunctional monomers may not be used, either. In some embodiments, from the standpoint of providing suitable cohesion to the photo-crosslinkable PSA, the amount of polyfunctional monomer used relative to the entire monomers can be, for instance, 0.001% by weight or higher, 0.005% by weight or higher, 0.01% by weight or higher, or even 0.03% by weight or higher.

From the standpoint of the photo-crosslinkable PSA's surface conformity, etc., in some embodiments, a bifunctional monomer can be preferably used as the polyfunctional monomer. The ratio of bifunctional monomer in the entire polyfunctional monomers used can be, for instance, 50% by weight or higher, 70% by weight or higher, 90% by weight or higher, or even 100% by weight.

The weight ratio of BP polymer (A) in the combined amount of BP polymer (A) and ethylenically unsaturated compound (B) in the PSA composition is not particularly limited. It can be selected to favorably balance the surface conformity of the photo-crosslinkable PSA formed from the PSA composition and the deformation resistance of the photo-crosslinked product thereof. In some embodiment, the BP polymer has a weight fraction of, for instance, possibly 1% by weight or higher, usually suitably 5% by weight or higher. From the standpoint of enhancing the effect of photo-crosslinking, it can be 10% by weight or higher, 15% by weight or higher, 25% by weight or higher, 35% by weight or higher, 45% by weight or higher, or even 55% by weight or higher. From the standpoint of the ease of preparing and applying the PSA composition, in some embodiments, the BP polymer's weight fraction in the combined amount can be, for instance, below 99% by weight, below 95% by weight, below 85% by weight, below 70% by weight, below 50% by weight, or even below 40% by weight.

In the PSA composition disclosed herein, the weight ratio of organic solvent in the entire PSA composition is, for instance, possibly 30% by weight or lower, advantageously 20% by weight or lower, preferably 10% by weight or lower, or more preferably 5% by weight or lower. In some embodiments, the weight ratio of organic solvent can be 3% by weight or lower, 1% by weight or lower, 0.5% by weight or lower, 0.1% by weight or lower, or even 0.05% by weight or lower. It can also be essentially free of an organic solvent. It is preferable to lower the weight ratio of organic solvent in the PSA composition in view of reducing VOC of the photo-crosslinkable PSA formed from the PSA composition. The PSA composition disclosed herein comprises an ethylenically unsaturated compound (B) in addition to the BP polymer (A); and therefore, the ethylenically unsaturated compound (B) can be used as a diluent for the BP polymer (A). By this, even in the PSA composition in an embodiment comprising at least a certain amount of BP polymer (A) having at least a certain Mw value, an organic solvent may not be required to facilitate application of the PSA composition in a room temperature range (e.g. 20° C. to 40° C.) or the usage of the organic solvent can be reduced.

In some embodiments of the PSA composition disclosed herein, from the standpoint of the ease of application in the room temperature range, etc., the PSA composition has a viscosity (determined by a BH viscometer with a No. 5 rotor at 10 rpm at a measurement temperature of 30° C.; the same applies, hereinafter) of suitably 1000 Pa·s or less, preferably 100 Pa·s or less, or more preferably 50 Pa·s or less. The PSA composition can have a viscosity of, for instance, 30 Pa·s or less, 20 Pa·s or less, 10 Pa·s or less, or 5 Pa·s or less. The minimum viscosity of the PSA composition is not particularly limited. In view of making the PSA composition less repulsive in the applied area and reducing bleeding of the PSA composition at the periphery of the applied area, it is usually suitably 0.1 Pa·s or greater, 0.5 Pa·s or greater, or even 1 Pa·s or greater.

The PSA composition according to some embodiments comprises, as the ethylenically unsaturated compound (B), at least a monofunctional monomer (B1) (a monomer having one ethylenically unsaturated group). As the monofunctional monomer (B1), a corresponding compound can be selected for use among the aforementioned examples of the ethylenically unsaturated compound (B). For the monofunctional monomer (B1), solely one species or a combination of two or more species can be used.

Of the combined amount of BP polymer (A) and ethylenically unsaturated compound (B), the weight ratio of monofunctional monomer (B1) can be, for instance, 1% by weight or higher, 5% by weight or higher, or even 15% by weight or higher. In some embodiments, from the standpoint of the ease of preparing and applying the PSA composition, the weight ratio of monofunctional monomer (B1) can be 25% by weight or higher, 35% by weight or higher, or even 45% by weight or higher. The weight ratio of monofunctional monomer (B1) in the combined amount is, for instance, possibly 99% by weight or lower, usually suitably 95% by weight or lower, 85% by weight or lower, 75% by weight or lower, 65% by weight or lower, 55% by weight or lower, or even 45% by weight or lower.

In an embodiment of the PSA composition comprising a monofunctional monomer (B1), the grass transition temperature (Tg) determined by the Fox equation based on the monofunctional monomer (B1) composition is not particularly limited. For instance, it can be $-80°$ C. or higher and $250°$ C. or lower. From the standpoint of the compatibility between the polymer derived from the monofunctional monomer (B1) and other components, the Tg value based on the monofunctional monomer (B1) composition is usually preferably $150°$ C. or lower, possibly $100°$ C. or lower, $70°$ C. or lower, $50°$ C. or lower, or even $30°$ C. or lower. In some embodiments, from the standpoint of the surface conformity of the photo-crosslinkable PSA, the Tg value based on the monofunctional monomer (B1) composition is preferably below $0°$ C., more preferably $-10°$ C. or lower, possibly $-20°$ C. or lower, $-30°$ C. or lower, or even $-40°$ C. or lower. From the standpoint of the photo-crosslinkable PSA's cohesion and post-photo-crosslinking deformation resistance (e.g. bond durability to adherends), the Tg value based on the monofunctional monomer (B1) composition is usually advantageously $-60°$ C. or higher, possibly $-54°$ C. or higher, $-50°$ C. or higher, $-45°$ C. or higher, $-35°$ C.° C. or higher, or even $-25°$ C. or higher. The Tg value can be adjusted by the compounds used as the monofunctional monomer (B1) and their relative amounts used.

In the PSA composition comprising a BP polymer (A) and a monofunctional monomer (B1), the photo-crosslinkable PSA formed from the PSA composition and the photo-crosslinked product thereof, the BP polymer (A)'s Tg value (or "$Tg_A$" hereinafter) and the monofunctional monomer (B1)'s Tg (or "$Tg_{B1}$" hereinafter) based on its composition can be selected so that the difference in Tg (or $\Delta Tg$ hereinafter) determined by $Tg_{B1}$-$Tg_A$ (both in $°$ C.) is in the range of, for instance, $-50°$ C. or greater and $70°$ C. or less. It may be advantageous that the absolute value of difference in Tg is not excessively large in view of the compatibility in the photo-crosslinkable PSA and photo-crosslinked product. In some embodiments, $\Delta Tg$ can be, for instance, $-10°$ C. or greater, preferably $0°$ C. or greater, possibly $7°$ C. or greater, $10°$ C. or greater, $20°$ C. or greater, or even $30°$ C. or greater.

In some embodiments, ΔTg can be, for instance, 50° C. or less, 30° C. or less, or even 15° C. or less.

The PSA composition according to some embodiments includes, as the ethylenically unsaturated compound (B), at least a polyfunctional monomer (B2) (i.e. a compound having two or more ethylenically unsaturated groups). For the polyfunctional monomer (B2), solely one species or a combination of two or more species can be used. The amount of polyfunctional monomer (B2) used can be selected in the same manner as for the ratio of polyfunctional monomer in the entire monomers forming the PSA composition.

In an embodiment using both a monofunctional monomer (B1) and a polyfunctional monomer (B2) as the ethylenically unsaturated compound (B), the weight ratio of monofunctional monomer (B1) in the ethylenically unsaturated compound (B) is, for instance, possibly 1% by weight or higher, usually suitably 25% by weight or higher, possibly 50% by weight or higher, 75% by weight or higher, 95% by weight or higher, or even 99% by weight or higher. The weight ratio of monofunctional monomer (B1) in the ethylenically unsaturated compound (B) can be, for instance, 99.9% by weight or lower, or even 99.8% by weight or lower.

The PSA composition disclosed herein may include the ethylenically unsaturated compound (B) as a partial polymer or entirely as unreacted monomers. The PSA composition according to a preferable embodiment includes the ethylenically unsaturated compound (B) as a partial polymer. The polymerization method for partially polymerizing the ethylenically unsaturated compound (B) is not particularly limited. For instance, various heretofore known polymerization methods can be suitably selected and used, such as photopolymerization carried out by irradiation of light such as UV rays; radiation polymerization carried out by irradiation of radioactive rays such as β and γ rays; and thermal polymerization such as solution polymerization, emulsion polymerization and bulk polymerization. From the standpoint of the efficiency and convenience, photopolymerization can be preferably employed. According to photopolymerization, through polymerization conditions such as the amount of light irradiated (light dose), the monomer conversion can be easily controlled.

The monomer conversion of the ethylenically unsaturated compound (B) in the partial polymer is not particularly limited. From the standpoint of the ease of preparing and applying the PSA composition, the monomer conversion is usually suitably about 50% by weight or lower, or preferably about 40% by weight or lower (e.g. about 35% by weight or lower). The minimum monomer conversion is not particularly limited. It is typically about 1% by weight or higher, or usually suitably about 5% by weight or higher.

The PSA composition comprising the partial polymer of the ethylenically unsaturated compound (B) can be obtained, for instance, by partially polymerization a monomer mixture including the entire amount of the ethylenically unsaturated compound (B) used for preparation of the PSA composition according to a suitable polymerization method (e.g. photopolymerization). The PSA composition comprising the partial polymer of the ethylenically unsaturated compound (B) can be a mixture of a partial polymer of a monomer mixture including some of the ethylenically unsaturated compound (B) used for preparation of the PSA composition and the remaining ethylenically unsaturated compound (B) or a partial polymer thereof. As used herein, the term "complete polymer" indicates that the monomer conversion is above 95% by weight.

The partial polymer can be prepared, for instance, by UV-irradiating the ethylenically unsaturated compound. In case that the partial polymer is prepared in the presence of a BP polymer, when the reaction of ethylenically unsaturated groups is carried out with the UV irradiation conditions selected to not cause photoexcitation of benzophenone structures, a PSA composition comprising the BP polymer and a partial polymer of the ethylenically unsaturated compound can be obtained. As the light source, it is preferable to use a light source capable of radiating UV rays that are free of a <300 nm wavelength component or low in amount thereof, such as the aforementioned blacklight and UV-LED lamp.

Alternatively, after a partial polymer of the ethylenically unsaturated compound (B) is prepared in advance, the partial polymer can be mixed with a BP polymer to prepare the PSA composition. When UV-irradiating the ethylenically unsaturated compound in absence of benzophenone structures to prepare a partial polymer thereof, as the UV light source, it is possible to use either a non-BP-excitation light source or a BP-excitation light source.

In preparing the partial polymer of the ethylenically unsaturated compound (B), a photoinitiator can be used to accelerate the reaction of ethylenically unsaturated groups. Usable photoinitiators include ketal-based photoinitiators, acetophenone-based photoinitiators, benzoin ether-based photoinitiators, acylphosphine oxide-based photoinitiators, α-ketol-based photoinitiators, aromatic sulfonyl chloride-based photoinitiators, photoactive oxime-based photoinitiators, benzoin-based photoinitiators, benzil-based photoinitiators, benzophenone-based photoinitiators, alkylphenone-based photoinitiators and thioxanthone-based photoinitiators. It is preferable to use a photoinitiator that absorbs ≥300 nm wavelength light (e.g. ≥300 nm, ≤500 nm wavelength light) to generate radicals. For the photoinitiator, solely one species or a combination of two or more species can be used.

Photoinitiator (C)

The PSA composition can include a photoinitiator as necessary for enhancing or providing photo-curing properties, etc. Usable photoinitiators include ketal-based photoinitiators, acetophenone-based photoinitiators, benzoin ether-based photoinitiators, acylphosphine oxide-based photoinitiators, α-ketol-based photoinitiators, aromatic sulfonyl chloride-based photoinitiators, photoactive oxime-based photoinitiators, benzoin-based photoinitiators, benzil-based photoinitiators, benzophenone-based photoinitiators, alkylphenone-based photoinitiators and thioxanthone-based photoinitiators. For the photoinitiator, solely one species or a combination of two or more species can be used.

Specific examples of ketal-based photoinitiators include 2,2-dimethoxy-1,2-diphenylethane-1-one.

Specific examples of acetophenone-based photoinitiators include 1-hydroxycyclohexyl phenyl ketone, 4-phenoxydichloroacetophenone, 4-t-butyl-dichloroacetophenone, 1-[4-(2-hydroxyethoxy)-phenyl]-2-hydroxy-2-methyl-1-propane-1-one, 2-hydroxy-2-methyl-1-phenyl-propane-1-one and methoxyacetophenone Specific examples of benzoin ether-based photoinitiators include benzoin ethers such as benzoin methyl ether, benzoin ethyl ether, benzoin propyl ether, benzoin isopropyl ether and benzoin isobutyl ether as well as substituted benzoin ethers such as anisole methyl ether.

Specific examples of acylphosphine oxide-based photoinitiators include bis(2,4,6-trimethylbenzoyl)phenylphosphine oxide, bis(2,4,6-trimethylbenzoyl)-2,4-di-n-butoxyphenylphosphine oxide, 2,4,6-trimethylbenzoyldiphenylphosphine oxide and bis(2,6-dimethoxybenzoyl)-2,4,4-trimethylpentylphosphine oxide.

Specific examples of α-ketol-based photoinitiators include 2-methyl-2-hydroxypropiophenone and 1-[4-(2-hydroxyethyl)phenyl]-2-methylpropane-1-one. Specific examples of aromatic sulfonyl chloride-based photoinitiators include 2-naphthalenesulfonyl chloride. Specific examples of photoactive oxime-basedphotoinitiators include 1-phenyl-1,1-propanedione-2-(o-ethoxycarbonyl)-oxime. Specific examples of benzoin-based photoinitiators include benzoin. Specific examples of benzil-based photoinitiators include benzil.

Specific examples of benzophenone-based photoinitiators include benzoylbenzoic acid, 3,3'-dimethyl-4-methoxybenzophenone, polyvinylbenzophenone and α-hydroxycyclohexylphenylketone.

Specific examples of thioxanthone-based photoinitiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone and dodecylthioxanthone.

As the photoinitiator (C) included in the PSA composition, it is preferable to use a photoinitiator that absorbs ≥300 nm wavelength light (e.g. ≥300 nm, ≤500 nm wavelength light) to generate radicals. For the photoinitiator, solely one species or a combination of two or more species can be used. In some embodiments, a photoinitiator whose molecule is free of a phosphorous atom can be preferably used. The PSA composition disclosed herein can be essentially free of a P-containing photoinitiator.

The amount of photoinitiator in the PSA composition is not particularly limited and can be selected to suitably obtain desirable effects. In some embodiments, the photoinitiator content relative to 100 parts by weight of the monomers forming the PSA composition is, for instance, possibly about 0.005 part by weight or higher, usually suitably 0.01 part by weight or higher, preferably 0.05 part by weight or higher, also possibly 0.10 part by weight or higher, 0.15 part by weight or higher, or even 0.20 part by weight or higher. With increasing photoinitiator content, the photocuring ability of the PSA composition will increase. The photoinitiator content relative to 100 parts by weight of the monomers forming the PSA composition is usually suitably 5 parts by weight or lower, preferably 2 parts by weight or lower, possibly 1 part by weight or lower, 0.7 part by weight or lower, or even 0.5 part by weight or lower. It can be advantageous that the photoinitiator content is not excessively high in view of inhibiting gelation of the PSA composition, etc.

Crosslinking Agent

To the PSA composition, as necessary, a known crosslinking agent can be added, for instance, an isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agent, hydrazine-based crosslinking agent and amine-based crosslinking agent. As the crosslinking agent, a peroxide can also be used. Among these crosslinking agents, solely one species or a combination of two or more species can be used. The photo-crosslinkable PSA formed from a PSA composition comprising a crosslinking agent preferably includes the crosslinking agent primarily in the crosslinked form. The use of crosslinking agent enables suitable adjustment of the cohesive strength of the photo-crosslinkable PSA, etc.

When using a crosslinking agent, its amount used (when using two or more kinds of crosslinking agents, their combined amount) is not particularly limited. From the standpoint of obtaining a PSA showing well-balanced adhesive properties such as adhesive strength and cohesive strength, the amount of crosslinking agent used to 100 parts by weight of the monomers forming the PSA composition is usually suitably about 5 parts by weight or lower, possibly 3 parts by weight or lower, 1 part by weight or lower, 0.50 part by weight or lower, 0.30 part by weight or lower, or even 0.20 part by weight or lower. The minimum amount of crosslinking agent used is not particularly limited as long as it is higher than 0 part by weight to 100 parts by weight of the monomers forming the PSA composition. In some embodiments, the amount of crosslinking agent used to 100 parts by weight of the monomers forming the PSA composition can be 0.001 part by weight or higher, 0.01 part by weight or higher, 0.05 part by weight or higher, or even 0.10 part by weight or higher. The art disclosed herein can be preferably implemented in an embodiment not using a crosslinking agent.

Chain Transfer Agent

The PSA composition may comprise various kinds of heretofore known chain transfer agent. As the chain transfer agent, mercaptans can be used, such as n-dodecyl mercaptan, t-dodecyl mercaptan, thioglycolic acid and α-thioglycerol. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylaniline; terpenoids such as α-pinene and terpinolene; styrenes such as α-methylstyrene and α-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene. For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

Other components possibly included in the PSA composition include silane coupling agent. The use of silane coupling agent can increase the peel strength to adherends (e.g. a glass plate). The photo-crosslinkable PSA disclosed herein can include a silane coupling agent. The silane coupling agent-containing photo-crosslinkable PSA can be favorably formed, using a PSA composition comprising a silane coupling agent. For the silane coupling agent, solely one species or a combination of two or more species can be used.

Where necessary, the PSA composition disclosed herein may include, as other optional components, various additives generally used in the field of PSA, such as tackifier resin (e.g. rosin-based, petroleum-based, terpene-based, phenol-based, ketone-based kinds, etc.), viscosity-adjusting agent (e.g. thickener), leveling agent, antioxidant, plasticizer, filler, colorant including pigment and dye, stabilizing agent, preservative and anti-aging agent. As for these various additives, heretofore known species can be used by typical methods. As these do not particularly characterize the present invention, details are omitted.

It is noted that the art disclosed herein can exhibit good bonding strength without using an aforementioned tackifier resin. Thus, in some embodiments, of the PSA layer or the PSA composition, the amount of tackifier resin included relative to 100 parts by weight of monomers can be, for instance, less than 10 parts by weight, or even less than 5 parts by weight. The tackifier resin content can be less than 1 part by weight (e.g. less than 0.5 part by weight), or even less than 0.1 part by weight (0 part or greater and less than 0.1 part by weight). The PSA layer or the PSA composition may be free of a tackifier resin.

Formation of Photo-Crosslinkable PSA

The PSA composition disclosed herein is formulated to be able to form a BP polymer-containing photo-crosslinkable PSA when cured. The PSA composition is preferably cured to allow reaction of ethylenically unsaturated groups in the PSA composition while allowing the benzophenone structures in the PSA composition to remain. The curing can be more preferably carried out by irradiation of active energy rays. As the active energy rays for forming the photo-crosslinkable PSA, UV rays are preferable and UV rays that are free of a <300 nm wavelength component or low in amount thereof are more preferable.

The photo-crosslinkable PSA disclosed herein can be produced using a PSA composition disclosed herein. Such a photo-crosslinkable PSA may comprise a BP polymer (A) and a polymer (E) derived from an ethylenically unsaturated compound (B). In some preferable embodiments, in the PSA composition, the ethylenically unsaturated compound (B) may have a composition free of an ethylenically unsaturated BP. According to the PSA composition having such a composition, it is possible to produce a photo-crosslinkable PSA that comprises a BP polymer (A) and a polymer (E) derived from an ethylenically unsaturated compound (B), wherein the polymer (E) is a non-BP polymer.

This Description provides a method for producing a photo-crosslinkable PSA that can be crosslinked by benzophenone structures. The production method comprises obtaining a PSA composition comprising ethylenically unsaturated groups and benzophenone structures, and irradiating the PSA composition with active energy rays (preferably UV rays). The PSA composition may include a photoinitiator. The irradiation of active energy rays for curing the PSA composition is preferably performed to allow reaction of the ethylenically unsaturated groups while allowing the benzophenone structures to remain (unreacted). As the PSA composition, it is preferable to use a PSA composition comprising a BP polymer (A) and an ethylenically unsaturated compound (B). The photo-crosslinkable PSA production method can be preferably carried out, using a PSA composition disclosed herein. As the light source for curing the PSA composition to form a photo-crosslinkable PSA, it is preferable to use a light source capable of radiating UV rays that are free of a <300 nm wavelength component or low in amount thereof, such as the aforementioned blacklight and UV-LED lamp.

PSA Sheet

This Description provides a PSA sheet having a PSA layer formed from a photo-crosslinkable PSA disclosed herein.

FIG. 1 shows an example of the constitution of the PSA sheet disclosed herein. PSA sheet 1 is formed as an adhesively single-faced PSA sheet comprising a PSA layer 10 whose first surface 10A is an adhesion face (adhesive face) applied to adherend, and a substrate 20 laminated on the second surface 10B of PSA layer 10. PSA layer 10 is bonded to a first face 20A of substrate 20. As substrate 20, for instance, plastic film such as polyester film can be used. Substrate 20 can be optical film, for instance, a polarizing plate. In the example shown in FIG. 1, PSA layer 10 has a monolayer structure. PSA sheet 1 prior to use (before applied to adherend) may be in form of release-linered PSA sheet 50 in which adhesive face 10A is protected with release liner 30 having a releasable surface (release face) at least on the PSA layer side. Alternatively, it can be in a form where the second face 20B (the reverse side of the first face 20A, or the backside) of substrate 20 is a release face and adhesive face 10A is protected, wound or layered with the second face 20B of substrate 20 in contact with adhesive face 10A.

As for the release liner, no particular limitations are imposed. For example, it is possible to use a release liner in which a surface of a liner substrate such as resin film or paper is release-treated, or a release liner formed from a low adhesive material such as fluorine-based polymer (polytetrafluoroethylene, etc.) and polyolefin-based resin (polyethylene, polypropylene, etc.). For the release treatment, for instance, a release agent such as silicone-based and long-chain alkyl-based release agents can be used. In some embodiments, release-treated resin film can be preferably used as the release liner.

Figure 2:
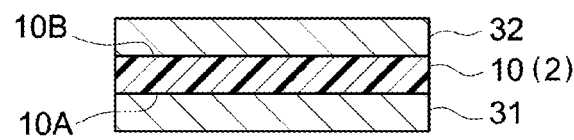
FIG. 2 shows a cross-sectional diagram schematically illustrating the PSA sheet according to another embodiment.

The PSA sheet disclosed herein may have a form of substrate-free double-faced PSA sheet formed of a PSA layer. As shown in FIG. 2, before used, substrate-free double-faced PSA sheet 2 can be in a state where the faces 10A and 10B of PSA layer 10 are protected with release liners 31 and 32 having releasable surfaces (release faces) at least on their PSA layer sides, respectively. Alternatively, it can be in a state where with release liner 31 having a release face on the backside (the surface opposite to the PSA side), it is rolled or layered to bring adhesive face 10B in contact with the backside of release liner 31 to protect adhesive faces 10A and 10B. The substrate-free double-faced PSA sheet can be used, for instance, by bonding a substrate to one face of the PSA layer.

Figure 3:
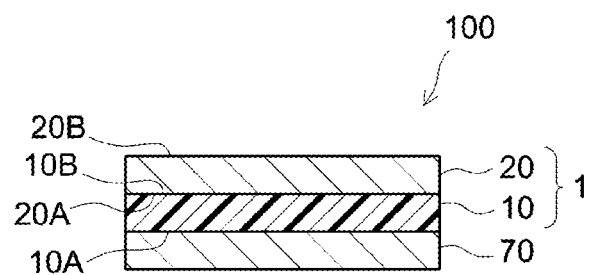
FIG. 3 shows a cross-sectional diagram schematically illustrating a PSA sheet-bearing optical member wherein the PSA sheet according to an embodiment is adhered to an optical member.

The PSA sheet disclosed herein can be a component of a PSA sheet-bearing optical member in which the optical member is bonded to the PSA layer's first surface. For instance, as shown in FIG. 3, PSA sheet 1 shown in FIG. 1 can be a component of a PSA sheet-bearing optical member 100 in which an optical member 70 is bonded to the first face 10A of PSA layer 110. The optical member can be, for instance, a glass plate, resin film, a metal plate, etc.

The PSA layer forming the PSA sheet disclosed herein can be a cured layer of the corresponding PSA composition. For instance, the PSA layer can be obtained by providing (e.g. applying) the PSA composition to a suitable surface and curing the PSA composition. The PSA composition can be preferably cured by irradiation of active energy rays. As the active energy rays for forming the PSA layer, UV rays are preferable and UV rays that are free of a <300 nm wavelength component or low in amount thereof are more preferable.

The PSA composition can be applied with, for example, a conventional coater such as a gravure roll coater, a reverse roll coater, a kiss-roll coater, a dip roll coater, a bar coater, a knife coater and a spray coater. With respect to a PSA sheet having a substrate, as the method for providing a PSA layer onto the substrate, it is possible to use a direct method where the PSA composition is directly provided to the substrate or a transfer method where a PSA layer formed on a release face is transferred to the substrate.

The thickness of the PSA layer is not particularly limited. It can be, for instance, about 3 µm to 2000 µm. From the standpoint of the tightness of adhesion to adherend such as surface conformity (e.g. contour conformity), in some embodiments, the thickness of the PSA layer is, for instance, possibly 5 µm or greater, suitably 10 µm or greater, preferably 20 µm or greater, or more preferably 30 µm or greater. The thickness of the PSA layer can also be 50 µm or greater, greater than 50 µm, 70 µm or greater, 100 µm or greater, or even 120 µm or greater. From the standpoint of preventing the occurrence of leftover adhesive residue due to cohesive failure of the PSA layer, in some embodiments, the thickness of the PSA layer can be, for instance, 1000 µm or less, 700 µm or less, 500 µm or less, 300 µm or less, even 200 µm or less, or 170 µm or less. The art disclosed herein can also be favorably implemented in an embodiment of a PSA sheet whose PSA layer has a thickness of 130 µm or less, 90 µm or less, or 60 µm or less (or 40 µm or less). It is noted that with respect to a PSA sheet that has a PSA layer having a multilayer structure with two or more layers, the PSA layer's thickness refers to the thickness from the adhesive face adhered to adherends through the reverse face of the adhesive face. From the standpoint of the surface conformity, it is preferable that the multilayer PSA layer does not include a non-PSA layer (e.g. resin film) in the thickness of the PSA layer (i.e. between the adhesive face adhered to adherends and the reverse face of the adhesive face).

Substrate

The PSA sheet according to some embodiments may be in a form of substrate-supported PSA sheet including a substrate bonded to the PSA layer. The material of substrate is not particularly limited and can be suitably selected in accordance with the purpose and application of the PSA sheet. Non-limiting examples of the substrate that may be used include plastic films (resin films) including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foil such as aluminum foil and copper foil. The substrate may be formed of a composite of these materials. Examples of the substrate having such a composite structure include a substrate having a layered structure of metal foil and plastic film, and a plastic sheet reinforced with inorganic fibers such as glass cloth.

As the substrate of the PSA sheet disclosed herein, various kinds of film (or support film, hereinafter) can be preferably used. The support film can be a porous film such as a foam film and a non-woven fabric sheet, a non-porous film, or a film having a layered structure of porous and non-porous layers. In some embodiment, a preferable support film comprises a resin film capable of independently holding its shape (standing by itself or independently) as the base film. The "resin film" here means a resin film having a non-porous structure and is typically substantially free of air bubbles (void-less). Thus, the concept of resin film is distinct from foam films and non-woven fabrics. The resin film may have a monolayer structure or a multilayer structure with two or more layers (e.g. a three-layer structure).

Examples of the resin material forming the resin film include resins such as polyester; polyolefin; polycycloolefin derived from a monomer having an aliphatic ring structure such as a norbornene structure; polyamide (PA) such as nylon 6, nylon 66 and partially aromatic polyamide; polyimide (PI) such as colorless and transparent polyimide (CPI); polyamide-imide (PAI); polyether ether ketone (PEEK); polyether sulfone (PES); polyphenylene sulfide (PPS); polycarbonate (PC); polyurethane (PU); ethylene-vinyl acetate copolymers (EVA); polyvinyl alcohol (PVA); polystyrene; ABS resin; polyvinyl chloride; polyvinylidene chloride; fluororesin such as polytetrafluoroethylene (PTFE); acrylic resin such as polymethyl methacrylate; cellulose-based polymer such as diacetyl cellulose and triacetyl cellulose (TAC); vinyl butyral-based polymer; arylate-based polymer; polyoxymethylene-based polymer; and epoxy-based polymer. The resin film may be formed from a resin material containing one species of such resin alone or a resin material in which two or more species are blended. The resin film may be non-stretched or stretched (e.g. uniaxially stretched or biaxially stretched).

Favorable examples of the resin material forming the resin film include polyester resins, PPS resins, polyolefin resins and polyimide resins. Here, the polyester resin refers to a resin containing more than 50% polyester by weight. Similarly, the PPS resin refers to a resin containing more than 50% PPS by weight, the polyolefin resin refers to a resin containing more than 50% polyolefin by weight, and the polyimide resin refers to a resin containing more than 50% polyimide by weight.

As the polyester resin, it is typical to use a polyester-based resin whose primary component is a polyester obtainable by polycondensation of a dicarboxylic acid and a diol. Specific examples of the polyester resin include polyethylene terephthalate (PET), polybutylene terephthalate (PBT), polyethylene naphthalate (PEN), and polybutylene naphthalate.

As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polypropylene (PP) and polyethylene (PE) are blended.

Specific examples of the resin film that may be preferably used as the substrate include PET film, PEN film, PPS film, PEEK film, CPI film, CPP film and OPP film. Preferable examples in view of the strength include PET film, PEN film, PPS film, PEEK film and CPI film. From the standpoint of the availability, size stability, optical properties, etc., preferable examples include PET film, CPI film and TAC film.

The resin film may include, as necessary, known additives such as photo stabilizer, antioxidant, antistatic agent, colorant (dye, pigment, etc.), fillers, slip agent and anti-blocking agent. The amount of an additive is not particularly limited and can be suitably selected according to the application of the PSA sheet, etc.

The method for producing the resin film is not particularly limited. For instance, heretofore known general resin film formation methods can be suitably employed, such as extrusion molding, inflation molding, T-die casting and calendar rolling.

The substrate may be substantially formed from such resin film. Alternatively, the substrate may include a secondary layer in addition to the resin film. Examples of the secondary layer include a layer for adjusting optical properties (such as a colored layer and an antireflection layer), a print layer and laminate layer to provide a desirable appearance to the substrate or to the PSA sheet, a treated surface layer such as an antistatic layer, a primer layer, and a release layer. The substrate can also be an optical member (e.g. optical film) described later.

The thickness of the substrate is not particularly limited and can be suitably selected in accordance with the purpose and application of the PSA sheet. The substrate's thickness is usually suitably, for instance, 1000 μm or less, 500 μm or less, 100 μm or less, 70 μm or less, 50 μm or less, 25 μm or less, 10 μm or less, or even 5 μm or less. With decreasing thickness of the substrate, the PSA sheet's flexibility and conformability to surface structures of adherends tend to improve. From the standpoint of the ease of handling, processing and so on, the substrate's thickness can be, for instance, 2 μm or greater, greater than 5 μm, or even greater than 10 μm. In some embodiments, the substrate's thickness can be, for instance, 20 μm or greater, 35 μm or greater, or even 55 μm or greater.

Of the substrate, the face on the side to be bonded to the PSA layer may be subjected as necessary to a heretofore known surface treatment such as corona discharge treatment, plasma treatment, UV irradiation, acid treatment, alkali treatment, primer coating, and antistatic treatment. These surface treatments may increase the tightness of adhesion between the substrate and the PSA layer, that is, the anchoring of the PSA layer to the substrate. The composition of the primer is not particularly limited and can be suitably selected among known species. The thickness of the primer layer is not particularly limited and is usually suitably about 0.01 μm to 1 μm, or preferably about 0.1 μm to 1 μm.

Of the substrate, the backside (or the face on the reverse side of the side to be bonded to the PSA layer) may be subjected as necessary to a heretofore known surface treatment such as release treatment, treatment to enhance bonding ability or adhesiveness, and antistatic treatment. For instance, by treating the backside of the substrate with a release agent, the unwinding force of the PSA sheet in a rolled form can be reduced. As the release agent, it is possible to use a silicone-based release agent, long-chain alkyl release agent, olefinic release agent, fluorine-based release agent, aliphatic amide-based release agent and molybdenum sulfide, silica powder and the like.

Properties of PSA Sheet

Peel Strength

In the PSA sheet disclosed herein, the peel strength determined according to the aforementioned peel strength measurement procedure (more specifically, determined by the method described later in Examples) is, for instance, possibly about 0.5 N/10 mm or greater, or usually suitably about 1.0 N/10 mm or greater. From the standpoint of obtaining greater bonding reliability, the peel strength is, for instance, preferably about 1.5 N/10 mm or greater, or preferably about 2.0 N/10 mm or greater. In the PSA sheet according to an embodiment, the peel strength can be, for instance, about 3.0 N/10 mm or greater, about 4.5 N/10 mm or greater, or even about 5.5 N/10 mm or greater. The PSA sheet disclosed herein can be made in an embodiment having a peel strength of about 5.7 N/10 mm or greater, about 6.5 N/10 mm or greater, about 7 N/10 mm or greater, about 8 N/10 mm or greater, about 9 N/10 mm or greater, about 10 N/10 mm or greater, about 11 N/10 mm or greater, about 12 N/10 mm or greater, or even about 13 N/10 mm or greater. Such a strong bonding strength can be preferably obtained, for instance, by using a silane coupling agent. The maximum peel strength is not particularly limited. For instance, it can be 25 N/10 mm or less. From the standpoint of the balance with other physical properties, etc., it can be 20 N/10 mm or less, 15 N/10 mm or less, 10 N/10 mm or less, or even 8 N/10 mm or less.

Haze Value

In the art disclosed herein, the haze value of the PSA sheet is suitably about 10% or lower, or possibly about 5% or lower (e.g. about 3% or lower). In some embodiments, the haze value of the PSA sheet is preferably 1.0% or lower. Such a highly transparent PSA sheet is suitable for optical applications requiring high optical transparency. The PSA sheet's haze value can be below 1.0%, below 0.7%, or even 0.5% or lower (e.g. 0 to 0.5%). These haze values can be preferably applied to the haze value of the PSA layer formed of the photo-crosslinkable PSA.

Here, the "haze value" refers to the ratio of diffused light transmittance to total light transmittance when the analytical sample is irradiated with visible light. It is also called the cloudiness value. The haze value can be expressed by the next equation:

$$Th(\%) = Td/Tt \times 100$$

In the equation, Th is the haze value (%), Td is the diffused light transmittance, and Tt is the total light transmittance.

The haze value can be determined, using a haze meter (e.g. MR-100 available from Murakami Color Research Laboratory Co., Ltd.). The haze value can be adjusted by selecting, for instance, certain composition, thickness and so on for the PSA layer.

Method for Producing Laminate

The photo-crosslinkable PSA disclosed herein can be preferably used in an embodiment where the photo-crosslinkable PSA is layered on (laminated to) a member as the adherend and the photo-crosslinkable PSA is then photo-crosslinked. By this, it is possible to produce a laminate in which the photo-crosslinked product is reliably bonded to the adherend. The photo-crosslinkable PSA can be photo-crosslinked by irradiating the photo-crosslinkable PSA with active energy rays. As the active energy rays, UV rays comprising a wavelength component (e.g. a <300 nm wavelength component) capable of exciting benzophenone structures in the photo-crosslinkable PSA are preferable. The photo-crosslinkable PSA can be used as a PSA sheet having a PSA layer formed from the photo-crosslinkable PSA in producing the laminate. Thus, this Description provides a laminate production method comprising the following steps in the following order: applying a PSA sheet having a PSA layer formed from a photo-crosslinkable PSA disclosed herein to an adherend, and irradiating the PSA sheet with active energy rays to cause photo-crosslinking of the photo-crosslinkable PSA.

When the PSA layer of the PSA sheet used in an embodiment where the photo-crosslinking is performed after applied to an adherend has a multilayer structure, the photo-crosslinked PSA layer can be a partial layer (e.g. one layer) in the multilayer structure or the entire layer.

The photo-crosslinkable PSA disclosed herein can be used as a PSA sheet having a PSA layer formed of the photo-crosslinkable PSA in an embodiment where it is layered on (laminated to) a surface having contours. The photo-crosslinkable PSA may show good surface conformity (contour conformity) to an adherend surface having such a contour (protrusion). After the photo-crosslinkable PSA is layered, the photo-crosslinkable PSA can be photo-crosslinked to form a highly reliable bond. The contour can be of a print layer provided to the adherend surface. The contour can have a height of, for instance, 5 µm or greater, 10 µm or greater, 20 µm or greater, or even 30 µm or greater. The height of the contour is, for instance, possibly 100 µm or less, or preferably 70 µm or less.

Applications

The application of the photo-crosslinkable PSA disclosed herein is not particularly limited and it can be used in various applications. For instance, the photo-crosslinkable PSA disclosed herein can be used as a PSA sheet having a PSA layer formed of the photo-crosslinkable PSA for purposes such as fixing, bonding, shaping, decorating, protecting, and supporting a member of various products. The material forming at least the surface of the member can be, for instance, glass such as alkaline glass and non-alkaline glass; metals such as stainless steel (SUS) and aluminum; ceramic materials such as alumina and silica; resin materials such as acrylic resin, ABS resin, polycarbonate resin, polystyrene resin and colorless and transparent polyimide resin. The member may be of, for instance, various portable devices, automobiles, home electric appliance, etc. The member's face to which the PSA sheet is applied can be a coated surface formed with an acrylic paint or a paint based on polyester, alkyd, melamine, urethane, acid/epoxy crosslinking, or their composite (e.g. acrylic melamine paint, alkyd melamine paint); or a plated surface of a galvanized steel sheet, etc. The member can be a support film (e.g. resin film) exemplified as the possible material for the substrate. The PSA sheet disclosed herein can be, for instance, a component of a PSA sheet-bearing member in which such a member is bonded to one face of a PSA layer.

An example of preferable applications is an optical application. More specifically, for instance, the PSA sheet disclosed herein can be preferably used as an optical PSA sheet used for bonding optical members (for optical member bonding) or for manufacturing a product (optical product) in which the optical members are used.

The optical member refers to a member having optical properties (e.g. polarizability, light refractivity, light scattering properties, light reflectivity, light transmission, light absorption, light diffraction, optical rotation, visibility, etc.). The optical member is not particularly limited as long as it has optical properties. Examples include components of a device (optical device) such as a display device (an image display unit) and an input device as well as a member used for these devices, for instance, a polarizing plate, waveplate, retardation plate, optical compensation film, glaring film, light guide plate, reflective film, anti-reflection film, hard coat (HC) film, impact-absorbing film, anti-fouling film, photochromic film, light control film, transparent conductive film (ITO film), design film, decorative film, surface protection plate, prism, lens, color filter, transparent substrate, and laminates of these (or collectively referred to as "functional films"). The "plate" and "film" individually encompass forms of plate, film, sheet, etc. For instance, the "polarizing film" encompasses a "polarizing plate", "polarizing sheet" and the like.

Examples of the display device include a liquid crystal display device, organic EL (electroluminescence) display device, PDP (plasma display panel), and electronic paper. It can be preferably applied, especially when an expensive member is included, such as a foldable display device and a display device installed in a vehicle. Examples of the input device include a touch panel.

While no particular limitations are imposed, examples of the optical member include members (e.g. members in a form of sheets, films or plates) formed of glass, acrylic resin, polycarbonate, polyethylene terephthalate, metal foil, etc. As used herein, the "optical member" includes a member (design film, decoration film, surface protective film, etc.) that serves to provide decoration or protection while maintaining the visibility of a display device or an input device.

There are no particular limitations to how optical members are bonded using the PSA sheet disclosed herein. Examples of a possible embodiment include (1) optical members are bonded to each other via the PSA sheet disclosed herein, (2) an optical member is bonded to a non-optical member via the PSA sheet disclosed herein, and (3) the PSA sheet disclosed herein is in an embodiment including an optical member and is bonded to an optical or non-optical member. In the embodiment (3), the optical member-containing PSA sheet can be, for instance, a PSA sheet whose substrate is the optical member (e.g. optical film). Such a PSA sheet including an optical member as the substrate can be thought as an adhesive optical member (e.g. adhesive optical film). When the PSA sheet disclosed herein has a substrate and the functional film is used as the substrate, the PSA sheet disclosed herein can also be thought as "adhesive functional film" having the PSA layer disclosed herein on at least one face of the functional film.

The PSA sheet disclosed herein can be preferably used in an embodiment where it is applied to a non-water-absorbing smooth surface, for instance, a glass plate, metal plate and resin plate. The peeling method disclosed herein can be preferably employed as a method for peeling a PSA sheet from an aforementioned optical member. In particular, it is suitable as a method for peeling a PSA sheet adhered on a glass plate, such as alkaline glass and non-alkaline glass.

The matters disclosed in this Description include the following:
(1) A photo-crosslinkable PSA
   comprising a polymer having side-chain benzophenone structures, being a cured product of a PSA composition comprising an ethylenically unsaturated compound and a benzophenone structure-containing component, and having VOC emissions of 500 µg/g or less.

(2) The photo-crosslinkable PSA according to (1) above, wherein the benzophenone structure-containing component is a polymer having side-chain benzophenone structures.

(3) The photo-crosslinkable PSA according to (1) or (2) above, wherein the photo-crosslinkable PSA has an 80° C. shear storage modulus Gb' (kPa) and the photo-crosslinked product has an 80° C. shear storage modulus Gc' (kPa), satisfying the next relationship Gc' (kPa)–Gb' (kPa)≥2 kPa, with the photo-crosslinked product obtained by UV-irradiating the photo-crosslinkable PSA at a dose of 300 mW/cm² to a cumulative dose of 10000 mJ/cm² using a high-pressure mercury lamp.

(4) The photo-crosslinkable PSA according to any of (1) to (3) above, having an 80° C. shear storage modulus Gc' (kPa) of 40 kPa or higher, determined with its photo-crosslinked product obtained by UV-irradiating the photo-crosslinkable PSA at a dose of 300 mW/cm² to a cumulative dose of 10000 mJ/cm² using a high-pressure mercury lamp.

(5) A PSA sheet having a PSA layer formed from the photo-crosslinkable PSA according to any of (1) to (4) above and (13) to (18) below.

(6) The PSA sheet according to (5) above, having a peel strength of 1.0 N/10 mm or greater, determined by the following procedure:

Procedure for Measuring Peel Strength

The surface of the PSA layer is press-bonded to a glass plate with a 2 kg rubber roller moved back and forth once; the resultant is autoclaved (50° C., 0.5 MPa, 15 min) and then UV-irradiated at a dose of 300 mW/cm² to a cumulative dose of 10000 mJ/cm² using a high-pressure mercury lamp; subsequently, in the atmosphere at 25° C., at a tensile speed of 300 mm/min at a peel angle of 180°, while the PSA sheet is peeled from the glass plate, the peel strength is measured.

(7) A method for producing a laminate, the method comprising the following steps in the following order:
layering (laminating) a member and the photo-crosslinkable PSA according to any of (1) to (4) above and (13) to (18) below, and
allowing reaction of the benzophenone structures to cause photo-crosslinking of the photo-crosslinkable PSA.

(8) A method for producing a photo-crosslinkable PSA, the method comprising
obtaining a PSA composition comprising a polymer (A) having side-chain benzophenone structures and an ethylenically unsaturated compound (B); and
irradiating the PSA composition with active energy rays;
wherein the active energy rays are irradiated to allow reaction of the ethylenically unsaturated group of the ethylenically unsaturated compound (B) while allowing the benzophenone structures of the polymer (A) to remain (unreacted).

(9) The method according to (8) above, wherein the PSA composition comprises, as the ethylenically unsaturated compound (B), a compound (B1) having one ethylenically unsaturated group.

(10) The method according to (8) or (9) above, wherein the PSA composition comprises, as the ethylenically unsaturated compound (B), a compound (B2) having two or more ethylenically unsaturated groups.

(11) The method according to any of (8) to (10) above, wherein the PSA composition further comprises a photoinitiator (C).

(12) A PSA composition used for producing a photo-crosslinkable PSA comprising a polymer having side-chain benzophenone structures (e.g. the photo-crosslinkable PSA according to any of (1) to (4) above and (13) to (18) below), the PSA composition comprising
a polymer (A) having side-chain benzophenone structures,
an ethylenically unsaturated compound (B), and
a photoinitiator (C) that absorbs 300 nm to 500 nm wavelength light to generate radicals;
wherein, of the entire monomers forming the PSA composition, a compound having two or more ethylenically unsaturated groups has a weight fraction below 5% by weight.

(13) A photo-crosslinkable PSA comprising a polymer having side-chain benzophenone structures.

(14) The photo-crosslinkable PSA according to (13) above, comprising two or more species of polymers having varying monomer compositions among which at least one species is a polymer having side-chain benzophenone structures.

(15) The photo-crosslinkable PSA according to (12) or (13) above, having VOC emissions of 500 µg/g or less.

(16) The photo-crosslinkable PSA according to any of (13) to (15) above, that is a cured product of a PSA composition comprising an ethylenically unsaturated compound and a benzophenone structure-containing component.

(17) The photo-crosslinkable PSA according to any of (13) to (16) above, wherein the photo-crosslinkable PSA has an 80° C. shear storage modulus Gb' (kPa) and the photo-crosslinked product has an 80° C. shear storage modulus Gc' (kPa), satisfying the next relationship Gc' (kPa)–Gb' (kPa) ≥2 kPa, with the photo-crosslinked product obtained by UV-irradiating the photo-crosslinkable PSA at a dose of 300 mW/cm² to a cumulative dose of 10000 mJ/cm² using a high-pressure mercury lamp.

(18) The photo-crosslinkable PSA according to any of (13) to (17) above, having an 80° C. shear storage modulus Gc' (kPa) of 40 kPa or higher, determined with its photo-crosslinked product obtained by UV-irradiating the photo-crosslinkable PSA at a dose of 300 mW/cm² to a cumulative dose of 10000 mJ/cm² using a high-pressure mercury lamp.

Several working examples related to the present invention are described below, but these specific examples are not to limit the present invention. In the description below, "parts" and "%" are by weight unless otherwise specified.

Example 1

Preparation of PSA Composition

Were mixed 60 parts of side-chain-BP-containing acrylic copolymer (product name acResin UV3532 available from BASF Corporation, Tg: −60° C., Mw: 25×10⁴, BP equivalent: 10 mg/g), 30 parts of 2-ethylhexyl acrylate (2EHA), 10 parts of N-vinyl-2-pyrrolidone (NVP), 0.2 part of 1,6-hexanediol diacrylate (HDDA) and 0.15 part of photoinitiator p1 (product name OMNIRAD 651 available from IGM Regins) having an absorption peak in the wavelength range between 300 nm and 500 nm to prepare a PSA composition C1 for forming a photo-crosslinkable PSA. The PSA composition C1 had a viscosity of 2.4 Pa·s (BH viscometer, No.

5 rotor, 10 rpm, measurement temperature 30° C.) and an organic solvent content below 1% by weight.

Preparation of Photo-Crosslinkable PSA

To a 38 μm thick release film R1 (MRF #38 available from Mitsubishi Plastics, Inc.) having a release face on one side of polyester film, PSA composition C1 was applied and covered to block air with a release film R2 (MRE #38 available from Mitsubishi Plastics, Inc.) having a release face on one side of polyester film. Using a black light (product name FL15BL available from Toshiba Corporation), one side of the laminate was UV-irradiated at a dose of 5 mW/cm$^2$ to a cumulative dose of 800 mJ/cm$^2$. By this, was obtained a photo-crosslinkable PSA A1 (cured PSA composition C1) as a 150 μm thick PSA layer (substrate-free PSA sheet) placed between release films R1 and R2.

The irradiance value of the blacklight was measured with an industrial UV checker (available from Topcon Corporation, trade name UVR-T1 with light detector model number UD-T36) with peak sensitivity at 350 nm in wavelength.

Preparation of Laminate

From the resulting photo-crosslinkable PSA A1, was removed release film R2. To this, was adhered 75 μm thick corona-treated polyethylene terephthalate (PET) film. By this, was obtained a substrate-supported single-faced PSA sheet S1 in which one face of the PSA layer formed of photo-crosslinkable PSA A1 was permanently bonded to the PET film (substrate).

From the adhesive face of the single-faced PSA sheet, was removed release film R1. The exposed adhesive face was press-bonded to a glass plate (Gorilla Glass 3 available from Corning, Inc.) as a member with a 2 kg rubber roller moved back and forth once. This was autoclaved (50° C., 0.5 MPa, 15 min) and then UV-irradiated over the glass plate side at a dose of 300 mW/cm$^2$ to a cumulative dose of 10000 mJ/cm$^2$, using a high-pressure mercury lamp (product name H3000IJ22N available from Toshiba Corporation) to cause photo-crosslinking of PSA A1. In this manner, was prepared a laminate formed of PET film/PSA layer/glass plate.

The irradiance value of the high-pressure mercury lamp was measured with an industrial UV checker (available from Topcon Corporation, trade name UVR-T1 with light detector model number UD-T25) with peak sensitivity at 350 nm in wavelength.

Example 2

Were mixed 30 parts of side-chain-BP-containing acrylic copolymer (product name acResin UV3532 available from BASF Corporation, 38 parts of 2EHA, 4 parts of NVP, 28 parts of isobornyl acrylate (IBXA), 0.04 part of HDDA, 0.08 part of 3-acryloxypropyl methoxysilane (product name KBM-5103 available from Shin-Etsu Silicone) and 0.2 part of photoinitiator p2 (product name OMNIRAD 184 available from IGM Regins) having an absorption peak in the wavelength range between 300 nm and 500 nm to prepare a UV curable PSA composition C2 for forming a photo-crosslinkable PSA. The PSA composition C2 had a viscosity of 0.4 Pa·s (BH viscometer, No. 5 rotor, 10 rpm, measurement temperature 30° C.) and an organic solvent content below 1% by weight.

In place of PSA composition C1, was used PSA composition C2. Otherwise in the same manner as Example 1, was obtained a photo-crosslinkable PSAA2 (cured PSA composition C2) as a 150 μm thick PSA layer (substrate-free PSA sheet) placed between release films R1 and R2.

Using the photo-crosslinkable PSA A2, in the same manner as Example 1, was prepared a laminate formed of PET film/PSA layer/glass plate.

Example 3

Into a four-necked flask, was placed a monomer mixture formed of 78 parts of 2EHA, 18 parts of NVP and 4 parts of 2-hydroxyethyl acrylate (HEA) along with 0.07 part of a mixture of photoinitiators P1 and P2 at 1:1 weight ratio. Under nitrogen atmosphere, the mixture was UV-irradiated using the high-pressure mercury lamp to a viscosity of about 15 Pa·s (BH viscometer, No. 5 rotor, 10 rpm, measurement temperature 30° C.) to carry out photopolymerization. By this, was prepared monomer syrup comprising a partial polymer of the monomer mixture. To the monomer syrup, were added and mixed 10 parts of NVP, 20 parts of IBXA, 0.15 part of HDDA, 0.2 part of α-methylstyrene dimer (NOFMER MSD available from NOF Corporation) as chain transfer agent and 0.5 part of photoinitiator P1 (OMNIRAD 651) to prepare a PSA composition C3.

To the release face of release film R1 (MRF #38 available from Mitsubishi Plastics, Inc.), PSA composition C3 was applied and covered to block air with a release film R2 (MRE #38 available from Mitsubishi Plastics, Inc.). Using the black light, one side of the laminate was UV-irradiated at a dose of 5 mW/cm$^2$. For this, the UV irradiation time was adjusted so that about 5% of the entire ethylenically unsaturated compound used in preparing the PSA composition C3 remained unreacted (i.e. to obtain a monomer conversion of about 95%). In this manner, was obtained a PSA A3 (cured PSA composition C3) as a 150 μm thick PSA layer (substrate-free PSA sheet) placed between release films R1 and R2.

Using the photo-crosslinkable PSA A3, in the same manner as Example 1, was prepared a laminate formed of PET film/PSA layer/glass plate.

Example 4

Were mixed 50 parts of side-chain-BP-containing acrylic copolymer (product name acResin A260UV available from BASF Corporation; Tg: −39° C., Mw: 19×10$^4$, BP equivalent: 2 mg/g), 34 parts of n-butyl acrylate (BA), 16 parts of NVP and 0.2 part of photoinitiator P2 (OMNIRAD 184) to prepare a PSA composition C4 for forming a photo-crosslinkable PSA. The PSA composition C4 had a viscosity of 27 Pa·s (BH viscometer, No. 5 rotor, 10 rpm, measurement temperature 30° C.) and an organic solvent content below 1% by weight.

Using the PSA composition C4 in place of PSA composition C1, but otherwise in the same manner as Example 1, was obtained a photo-crosslinkable PSA A4 (cured PSA composition C4) as a 150 μm thick PSA layer (substrate-free PSA sheet) placed between release films R1 and R2. Using the photo-crosslinkable PSA A4, in the same manner as Example 1, was prepared a laminate formed of PET film/PSA layer/glass plate.

Measurement and Evaluation (1) Determination of Pre-Photo-Crosslinking Modulus Gb'

The PSA (substrate-free PSA sheet) according to each Example was folded up to a thickness of about 1.5 mm and a disc of 7.9 mm diameter was punched out to prepare a measurement sample. The measurement sample was placed between parallel plates; and while applying a shear strain at a frequency of 1 Hz using a rheometer (ARES available from Rheometric Scientific), dynamic viscoelastic analysis was carried out in the shear mode over a temperature range of −70° C. to 150° C. at a heating rate of 5° C./min to determine the 80° C. shear storage modulus Gb'. The results are shown in Table 1.

(2) Determination of Post-Photo-Crosslinking Modulus Gc'

While between release films R1 and R2, using the high-pressure mercury lamp, the PSA (substrate-free PSA sheet) according to each Example was UV-irradiated at a dose of 300 mW/cm² to a cumulative dose of 10000 mJ/cm² over one face to cause photo-crosslinking. Subsequently, release films R1 and R2 were removed and the layer B was folded up to a thickness of about 1.5 mm and a disc of 7.9 mm diameter was punched out to prepare a measurement sample. Dynamic viscoelastic analysis was conducted on this measurement sample in the same manner as for the measurement of pre-photo-crosslinking modulus Gb' to determine the 80° C. shear storage modulus Gc'. The results are shown in Table 1.

(3) Measurement of VOC Emissions

According to the aforementioned VOC test, the PSA (substrate-free PSA sheet) according to each Example was measured for VOC emissions. The results are shown in Table 1.

(4) Durability Test

To one face of a polarizing plate (product name REGQ-HC3 available from Nitto Denko Corporation, 92 μm thick), using 15 μm thick PSA, was adhered aluminum foil (product name NIPPAKU FOIL available from Mitsubishi Aluminum Co., Ltd., 12 μm thick). The resultant was used as the adherend bonded to one face of a substrate-free PSA sheet.

The substrate-free PSA sheet according to each Example was cut to a 60 mm×120 mm size while still having release liners R1 and R2. Release film R2 was then removed. The exposed adhesive face was adhered to the polarizing plate-side surface of the adherend with a handheld roller. Release liner R1 was then removed from the PSA. The exposed adhesive face was adhered to a glass plate (product name MICRO SLIDE GLASS, item #S available from Matsunami Glass Ind., Ltd.; 1.3 mm thick, 0.1% haze, wet frosted). In this manner, was obtained a laminate formed of a glass plate/PSA/polarizing plate.

The laminate was autoclaved (50° C., 0.5 MPa, 15 min) and then UV-irradiated using the high-pressure mercury lamp at a dose of 300 mW/cm² to a cumulative dose of 10000 mJ/cm² over the glass plate side to obtain a durability test sample.

The test sample was stored in an environment at 85° C. for 24 hours. Subsequently, in an environment at 23° C. and 50% RH, the sample was visually inspected and the durability was evaluated based on two standards shown below. The results are shown in the column headed "Bond durability" in Table 1. It is noted that in the PSA sheet according to either Example, absolutely no bubbles were found immediately after preparation of the durability test sample.

E (Excellent): air bubble formation not observed (excellent bond durability).
P (Poor): air bubble formation observed (poor bond durability).

(5) Peel Strength

From the PSA (substrate-free PSA sheet) according to each Example, was removed release film R2. The PSA was adhered to 75 μm thick corona-treated PET film to prepare a single-faced PSA sheet. This was cut to a 20 mm wide, 100 mm long size to prepare a test piece.

In an environment at 23° C. and 50% RH, from the test piece, was removed release film R1 and the exposed adhesive face was press-bonded to a glass plate (Gorilla Glass 3 available from Corning, Inc.) as the adherend with a 2 kg rubber roller moved back and forth once. This was autoclaved (50° C., 0.5 MPa, 15 min) and then UV-irradiated over the glass plate side at a dose of 300 mW/cm² to a cumulative dose of 10000 mJ/cm², using the high-pressure mercury lamp.

Subsequently, in the environment at 23° C. and 50% RH, using a tensile tester (universal tensile/compression testing machine, system name Tensile and Compression Testing Machine, TCM-1kNB available from Minebea Co., Ltd.), at a tensile speed of 300 mm/min at a peel angle of 180°, the peel strength of the test piece to the glass plate was measured. Three measurements were taken. Table 1 shows the value per 10 mm width (unit: N/10 mm) converted from their mean value.

TABLE 1

|  |  | Ex. 1 | Ex. 2 | Ex. 3 | Ex. 4 |
|---|---|---|---|---|---|
| Shear storage modulus at 80° C., 1 Hz (kPa) | Pre-photo-crosslinking (Gb') | 18.9 | 54.6 | 19.6 | 63.7 |
|  | Post-photo-crosslinking (Gc') | 51.0 | 63.7 | 25.6 | 71.0 |
|  | ΔG' | 32.1 | 9.1 | 6.0 | 7.3 |
| VOC emissions (μg/g) |  | ≤500 | ≤500 | >500 | ≤500 |
| Bond durability |  | E | E | P | E |
| Peel strength (N/10 mm) |  | 1.9 | 5.9 | 10 | 8.5 |

As shown in Table 1, the PSA of Examples 1, 2 and 4 clearly showed superior bond durability to the PSA of Example 3. The photo-crosslinkable PSA of Examples 1, 2 and 4 also had lower VOC emissions with clearly less odor than the PSA of Example 3.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PSA sheets
10 PSA layer
10A first face (adhesive face)
10B second face
20 substrate
20A first face
20B second face (backside)
30, 31, 32 release liners
50 release-linered PSA sheet
70 optical member
100 PSA sheet-bearing member

The invention claimed is:
1. A photo-crosslinkable pressure-sensitive adhesive
being formed from a pressure-sensitive adhesive composition comprising an ethylenically unsaturated compound and a polymer having side-chain benzophenone structures, and
comprising a polymer having unreacted side-chain benzophenone structures, wherein the pressure-sensitive adhesive composition comprises, as the ethylenically unsaturated compound, a compound having one ethylenically unsaturated group,
wherein, of the entire monomers forming the pressure-sensitive adhesive composition, a compound having two or more ethylenically unsaturated groups has a weight fraction of 1% by weight or lower.

2. The photo-crosslinkable pressure-sensitive adhesive according to claim 1, wherein the photo-crosslinkable pressure-sensitive adhesive has a shear storage modulus at 80° C., Gb' (kPa) and its photo-crosslinked product has a shear storage modulus at 80° C., Gc' (kPa), satisfying the next relationship Gc' (kPa)–Gb' (kPa) ≥2 kPa, with the photo-crosslinked product obtained by UV-irradiating the photo-crosslinkable pressure-sensitive adhesive at a dose of 300 mW/cm$^2$ to a cumulative dose of 10000 mJ/cm$^2$ using a high-pressure mercury lamp.

3. The photo-crosslinkable pressure-sensitive adhesive according to claim 1, having a shear storage modulus at 80° C., Gc' (kPa), of 40 kPa or higher, determined with its photo-crosslinked product obtained by UV-irradiating the photo-crosslinkable pressure-sensitive adhesive at a dose of 300 mW/cm$^2$ to a cumulative dose of 10000 mJ/cm$^2$ using a high-pressure mercury lamp.

4. The photo-crosslinkable pressure-sensitive adhesive according to claim 1, wherein the pressure-sensitive adhesive composition further comprises an organic solvent in an amount of 0.05% by weight to 30% by weight among the components of the pressure-sensitive adhesive composition.

5. A pressure-sensitive adhesive sheet having a pressure-sensitive adhesive layer formed from the photo-crosslinkable pressure-sensitive adhesive according to claim 1.

6. The pressure-sensitive adhesive sheet according to claim 5, having a peel strength of 1.0 N/10 mm or greater, determined by the following procedure:
[procedure for measuring peel strength]
the surface of the pressure-sensitive adhesive layer is press-bonded to a glass plate with a 2 kg rubber roller moved back and forth once; the resultant is autoclaved (50° C., 0.5 MPa, 15 min) and then UV-irradiated at a dose of 300 mW/cm$^2$ to a cumulative dose of 10000 mJ/cm$^2$ using a high-pressure mercury lamp; subsequently, in the atmosphere at 25° C., at a tensile speed of 300 mm/min at a peel angle of 180°, while the pressure-sensitive adhesive sheet is peeled from the glass plate, the peel strength is measured.

7. A method for producing a laminate, the method comprising the following steps in the following order:
laminating a member and the photo-crosslinkable pressure-sensitive adhesive according to claim 1, and
allowing reaction of the benzophenone structures to cause photo-crosslinking of the photo-crosslinkable pressure-sensitive adhesive.

8. A method for producing a photo-crosslinkable pressure-sensitive adhesive, the method comprising
obtaining a pressure-sensitive adhesive composition comprising a polymer (A) having side-chain benzophenone structures, an ethylenically unsaturated compound (B), and a photoinitiator (C) that absorbs 300 nm to 500 nm wavelength light to generate radicals; and
irradiating the pressure-sensitive adhesive composition with active energy rays;
wherein the pressure-sensitive adhesive composition comprises, as the ethylenically unsaturated compound (B), a compound (B1) having one ethylenically unsaturated group,
wherein, of the entire monomers forming the pressure-sensitive adhesive composition, a compound having two or more ethylenically unsaturated groups has a weight fraction of 1% by weight or lower, and
wherein the active energy rays are irradiated to allow reaction of the ethylenically unsaturated group of the ethylenically unsaturated compound (B) while allowing the benzophenone structures of the polymer (A) to remain.

9. A pressure-sensitive adhesive composition used for producing a photo-crosslinkable pressure-sensitive adhesive comprising a polymer having benzophenone structures in side chains, the pressure-sensitive adhesive composition comprising
a polymer (A) having benzophenone structures in side chains,
an ethylenically unsaturated compound (B), and
a photoinitiator (C) that absorbs 300 nm to 500 nm wavelength light to generate radicals;
wherein the pressure-sensitive adhesive composition comprises, as the ethylenically unsaturated compound (B), a compound (B1) having one ethylenically unsaturated group, and
wherein, of the entire monomers forming the pressure-sensitive adhesive composition, a compound having two or more ethylenically unsaturated groups has a weight fraction of 1% by weight or lower below 5% by weight.

10. The pressure-sensitive adhesive composition according to claim 9, further comprising an organic solvent in an amount of 0.05% by weight to 30% by weight among the components of the pressure-sensitive adhesive composition.

* * * * *